United States Patent
Miyake et al.

(10) Patent No.: US 10,385,206 B2
(45) Date of Patent: Aug. 20, 2019

(54) POLYCARBONATE RESIN COMPOSITION AND MOLDED ARTICLE THEREOF

(71) Applicant: TEIJIN LIMITED, Osaka (JP)

(72) Inventors: Toshiyuki Miyake, Osaka (JP); Yukari Nita, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/532,607

(22) PCT Filed: Nov. 27, 2015

(86) PCT No.: PCT/JP2015/084078
§ 371 (c)(1),
(2) Date: Jun. 2, 2017

(87) PCT Pub. No.: WO2016/088861
PCT Pub. Date: Jun. 9, 2016

(65) Prior Publication Data
US 2017/0335100 A1 Nov. 23, 2017

(30) Foreign Application Priority Data

Dec. 2, 2014 (JP) ................................ 2014-244012
Mar. 10, 2015 (JP) ................................ 2015-047154

(51) Int. Cl.
| | |
|---|---|
| *C08G 69/00* | (2006.01) |
| *C08L 69/00* | (2006.01) |
| *C08G 64/18* | (2006.01) |
| *C08K 5/42* | (2006.01) |
| *C08L 23/02* | (2006.01) |
| *C08L 27/18* | (2006.01) |
| *C08L 83/10* | (2006.01) |

(52) U.S. Cl.
CPC .............. *C08L 69/00* (2013.01); *C08G 64/18* (2013.01); *C08G 64/186* (2013.01); *C08K 5/42* (2013.01); *C08L 23/02* (2013.01); *C08L 27/18* (2013.01); *C08L 83/10* (2013.01); *C08L 2201/02* (2013.01)

(58) Field of Classification Search
None
See application file for complete search history.

(56) References Cited

U.S. PATENT DOCUMENTS

| | | | | |
|---|---|---|---|---|
| 4,245,058 A * | 1/1981 | Liu | .......................... | C08L 69/00 525/146 |
| 4,384,076 A * | 5/1983 | Ohara | ..................... | C08L 69/00 525/67 |
| 4,520,164 A * | 5/1985 | Liu | .......................... | C08L 69/00 524/508 |
| 4,666,985 A * | 5/1987 | Liu | .......................... | C08L 69/00 525/146 |
| 5,290,859 A * | 3/1994 | Niessner | ................. | C08L 25/12 524/504 |
| 5,416,148 A * | 5/1995 | Farah | ...................... | C08L 69/00 524/409 |
| 5,451,632 A * | 9/1995 | Okumura | ............. | C08G 64/186 524/418 |
| 5,488,086 A * | 1/1996 | Umeda | .................... | C08L 69/00 525/104 |
| 5,981,661 A * | 11/1999 | Liao | ........................ | C08L 67/02 523/436 |
| 5,994,467 A * | 11/1999 | Farah | ...................... | C08L 69/00 525/166 |
| 6,011,116 A * | 1/2000 | Aoyama | ............... | C08F 255/08 525/232 |
| 6,025,420 A * | 2/2000 | Pham | ...................... | C08L 69/00 524/115 |
| 7,166,687 B2 * | 1/2007 | Venderbosch | .......... | C08L 69/00 525/469 |
| 7,321,014 B2 * | 1/2008 | Glasgow | ................ | C08G 63/64 525/446 |
| 7,943,692 B2 * | 5/2011 | Lee | ......................... | C08L 69/00 524/490 |
| 8,779,040 B2 * | 7/2014 | van der Weele | ..... | C08K 5/5399 524/116 |
| 8,937,127 B2 * | 1/2015 | Sybert | .................... | C09K 21/14 428/220 |
| 9,018,286 B2 * | 4/2015 | Daga | ....................... | C08K 3/22 524/138 |

(Continued)

FOREIGN PATENT DOCUMENTS

| | | |
|---|---|---|
| JP | 5-247195 | 9/1993 |
| JP | 2006-512447 | 4/2006 |

(Continued)

OTHER PUBLICATIONS

Technical data sheet for Hi-Wax 110, 3 pages, 2018. (Year: 2018).*
Technical Data Sheet for Hi-Zex 3300F, 1 page, 2018 (Year: 2018).*
International Preliminary Report on Patentability dated Jun. 6, 2017 in International (PCT) Application No. PCT/JP2015/084078.
Bledzki et al., "Microfoams of Polycarbonate have High Impact Properties", ANTEC 2001 pp. 1737-1740 (2001).
International Search Report dated Jan. 19, 2016 in International (PCT) Application No. PCT/JP2015/084078.

*Primary Examiner* — Robert S Loewe

(74) *Attorney, Agent, or Firm* — Wenderoth, Lind & Ponack, L.L.P.

(57) ABSTRACT

A polycarbonate resin composition which has excellent low-temperature impact resistance and flowability high enough to enable thin molding and provides a coated molded article having a good appearance and high impact resistance. The resin composition comprises 100 parts by weight of a resin component including a polycarbonate resin (component A) and a polycarbonate-polydiorganosiloxane copolymer resin (component B) and 0.5 to 2.5 parts by weight of a polyolefin resin (component C).

12 Claims, No Drawings

(56) References Cited

U.S. PATENT DOCUMENTS

| | | | |
|---|---|---|---|
| 9,296,894 B2* | 3/2016 | Wang | C08L 69/005 |
| 2004/0127635 A1* | 7/2004 | Taraiya | C08L 69/00 |
| | | | 524/588 |
| 2005/0187372 A1* | 8/2005 | Venderbosch | C08L 69/00 |
| | | | 528/196 |
| 2006/0111501 A1* | 5/2006 | Cont | B82Y 30/00 |
| | | | 524/492 |
| 2007/0149722 A1* | 6/2007 | Fujiguchi | C08L 69/00 |
| | | | 525/464 |
| 2008/0234434 A1* | 9/2008 | Lin | C08F 255/00 |
| | | | 525/122 |
| 2009/0036593 A1* | 2/2009 | DeRudder | C08L 55/02 |
| | | | 524/506 |
| 2009/0088514 A1* | 4/2009 | Shiping | C08L 69/00 |
| | | | 524/451 |
| 2009/0130451 A1* | 5/2009 | Farrell | B29C 65/1616 |
| | | | 428/411.1 |
| 2011/0028615 A1* | 2/2011 | Li | C08L 69/00 |
| | | | 524/140 |
| 2011/0060067 A1* | 3/2011 | Thiagarajan | C08J 9/0071 |
| | | | 521/154 |
| 2012/0172508 A1* | 7/2012 | Jung | C08L 69/00 |
| | | | 524/162 |
| 2012/0271009 A1* | 10/2012 | Higaki | C08G 64/186 |
| | | | 525/464 |
| 2013/0035429 A1* | 2/2013 | Tajima | C08L 69/00 |
| | | | 524/165 |
| 2013/0085240 A1* | 4/2013 | Sybert | C09K 21/14 |
| | | | 525/464 |
| 2013/0137801 A1* | 5/2013 | Ha | C08L 69/00 |
| | | | 524/115 |
| 2013/0317141 A1* | 11/2013 | Cheng | C08K 3/22 |
| | | | 524/116 |
| 2013/0317150 A1* | 11/2013 | Wan | C08L 67/02 |
| | | | 524/127 |
| 2014/0058023 A1* | 2/2014 | Wan | C08L 69/00 |
| | | | 524/127 |
| 2014/0179843 A1* | 6/2014 | van der Mee | C08L 69/005 |
| | | | 524/127 |
| 2014/0243467 A1* | 8/2014 | Dern | C08L 69/00 |
| | | | 524/508 |
| 2014/0303296 A1* | 10/2014 | Inazawa | C08L 27/18 |
| | | | 524/127 |
| 2014/0323623 A1* | 10/2014 | Miyake | C08L 69/00 |
| | | | 524/120 |
| 2014/0329920 A1* | 11/2014 | Rosenquist | C08L 69/00 |
| | | | 521/134 |
| 2014/0357809 A1* | 12/2014 | Miyake | C08L 69/00 |
| | | | 525/461 |
| 2015/0183958 A1* | 7/2015 | Woo | C08K 5/5399 |
| | | | 524/116 |
| 2016/0024301 A1 | 1/2016 | Hayashida | |

FOREIGN PATENT DOCUMENTS

| | | |
|---|---|---|
| JP | 2010-222480 | 10/2010 |
| JP | 2010-261009 | 11/2010 |
| JP | 2011-21127 | 2/2011 |
| JP | 2013-177481 | 9/2013 |
| JP | 2013-541624 | 11/2013 |
| WO | 2013/141005 | 9/2013 |
| WO | 2014/148641 | 9/2014 |

* cited by examiner

POLYCARBONATE RESIN COMPOSITION AND MOLDED ARTICLE THEREOF

TECHNICAL FIELD

The present invention relates to a resin composition comprising a polycarbonate. More specifically, it relates to a resin composition which is excellent in low-temperature impact resistance and flowability and rarely deteriorates in mechanical strength and provides a good appearance even when it is coated and to a molded article thereof. The present invention also relates to a resin composition which has excellent low-temperature impact resistance, tracking resistance and flame retardancy and rarely produces a volatile gas causing an electric contact fault and to a molded article thereof.

BACKGROUND ART

A polycarbonate resin is used for many applications such as mechanical parts, auto parts, electric and electronic parts and office equipment parts as it has excellent properties such as mechanical strength, dimensional stability and flame retardancy. Due to the recent dissemination of mobile information terminals such as smartphones and tablets, mechanical strength, especially impact resistance in various environments is now required as compared with conventional information terminals. Most of exterior materials are coated from the viewpoints of a superior design and a good appearance. Therefore, a good appearance and impact resistance in a coated state are required for resins for mobile information terminal housings, and further improvement is desired than conventional polycarbonate resins.

Patent Document 1 reports a resin composition which comprises an aromatic polycarbonate resin, a polyolefin resin and an acrylic elastic polymer containing acrylic rubber containing 8 to 31 wt % of butadiene as a key component and has improved low-temperature impact resistance. Although the resin composition satisfies the requirement for mechanical strength, it has a big problem with chemical resistance.

Patent Documents 2 and 3 report a resin composition comprising a specific acrylic elastic polymer out of the above components. However, the resin composition is unsatisfactory in terms of flowability and chemical resistance.

Meanwhile, as a resin having excellent low-temperature impact resistance, there is known a polycarbonate-polydiorganosiloxane copolymer resin (for example, Patent Document 4). Further, Patent Document 5 reports a resin in which polysiloxane domains having an average domain size of 20 to 45 nm are incorporated into a polycarbonate matrix. This report teaches that when the polysiloxane domains have a specific size, low-temperature impact resistance becomes high. However, these polycarbonate-polydiorganosiloxane copolymer resins may produce a coating defect and are unsatisfactory in terms of impact resistance after coating.

Patent Document 6 reports a resin composition obtained by mixing a rubber-like elastic material with a polycarbonate-polydiorganosiloxane copolymer resin as a resin composition having excellent impact resistance. This resin composition may produce a coating defect, and there is no description of impact resistance after coating.

As a resin composition comprising a polycarbonate and having both impact resistance and organic solvent resistance, Patent Document 7 reports a resin composition which comprises an aromatic polycarbonate, a polycarbonate-polydiorganosiloxane copolymer resin and a hydrogenated aliphatic diene-vinyl aromatic block copolymer graft modified by an unsaturated dicarboxylic acid. However, this resin composition may produce a coating defect and needs to be further improved.

Patent Document 8 reports a resin composition which comprises an aromatic polycarbonate resin, a polyolefin resin and an acrylic elastic polymer. This report states the improvement of low-temperature impact resistance and chemical resistance. However, the resin composition is unsatisfactory in terms of the properties of a thin molded article thereof close to a housing for actual mobile information terminals.

Patent Document 9 discloses a mobile electronic equipment housing which comprises a polycarbonate-polydiorganosiloxane copolymer resin having a specific siloxane chain length and an aromatic polycarbonate except for the copolymer resin. However, this resin composition may produce a coating defect and needs the further improvement of chemical resistance.

Meanwhile, Bledzki et al. report that impact resistance at −20° C. is improved by adding 3 wt % of polypropylene to a polycarbonate resin in non-Patent Document 1. However, this resin composition is also still unsatisfactory in terms of low-temperature impact resistance and has a problem that a molded article thereof has a poor appearance. Therefore, it is not suitable for use in actual molded articles.

Patent Document 10 discloses that a molded article produced by adding a low-density ethylene-based copolymer to a polycarbonate resin has improved chemical resistance while it retains impact resistance. However, this document is silent about low-temperature impact resistance. The resin composition disclosed by this document is unsatisfactory in terms of the properties of a thin molded article thereof close to a housing for actual mobile information terminals.

(Patent Document 1) JP-A 58-34850
(Patent Document 2) JP-A 56-76449
(Patent Document 3) JP-A 4-249576
(Patent Document 4) JP-A 5-247195
(Patent Document 5) JP-B 2006-523243
(Patent Document 6) JP-A 4-225060
(Patent Document 7) JP-A 3-229755
(Patent Document 8) JP-A 2010-222480
(Patent Document 9) JP-A 2011-21127
(Patent Document 10) JP-A 2010-261009
(Non-Patent Document 1) ANTEC2001 p. 1737-p. 1740

DISCLOSURE OF THE INVENTION

It is an object of the present invention to provide a resin composition which comprises a polycarbonate resin, has excellent low-temperature impact resistance and flowability high enough to enable thin molding and provides a coated molded article having a good appearance and impact resistance as well as a molded article thereof. The inventors of the present invention conducted intensive studies to attain this object and found that when a polycarbonate resin is mixed with a polycarbonate-polydiorganosiloxane copolymer resin and a polyolefin resin, a resin composition having flowability suitable for thin molding and low-temperature impact resistance and chemical resistance high enough to be used for mobile electronic equipment housings is obtained. The present invention was accomplished based on this finding.

It is another object of the present invention to provide a resin composition which comprises a polycarbonate resin, has excellent low-temperature impact resistance, tracking resistance and flame retardancy and rarely produces a gas causing an electric contact fault as well as a molded article thereof. The inventors of the present invention conducted intensive studies to attain this object and found that when a polycarbonate resin is mixed with a specific polycarbonate-polydiorganosiloxane copolymer resin, an organic metal salt compound and a polyolefin resin, a resin composition which has excellent low-temperature impact resistance, tracking resistance and flame retardancy and rarely produces a gas causing an electric contact fault is obtained. The present invention was accomplished based on this finding.

That is, the objects of the present invention can be attained by the following invention.

1. A resin composition comprising 100 parts by weight of a resin component comprising a polycarbonate resin (component A) and a polycarbonate-polydiorganosiloxane copolymer resin (component B) and 0.5 to 2.5 parts by weight of a polyolefin resin (component C).
2. The resin composition in the above paragraph 1, wherein the component B is a polycarbonate-polydiorganosiloxane copolymer resin comprising a polycarbonate block represented by the following general formula [1] and a polydiorganosiloxane block represented by the following general formula [3].

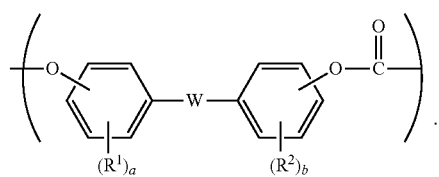

[In the above general formula [1], $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group, when there are a plurality of $R^1$'s and a plurality of $R^2$'s, they may be the same or different, "a" and "b" are each an integer of 1 to 4, and W is a single bond or at least one group selected from the group consisting of groups represented by the following general formulas [2].

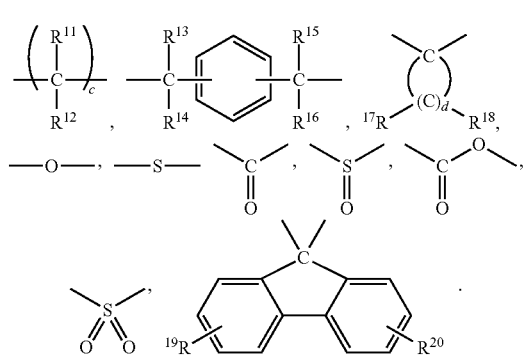

(In the above general formulas [2], $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms, $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, when there are a plurality of each of them, they may be the same or different, "c" is an integer of 1 to 10, and "d" is an integer of 4 to 7.)]

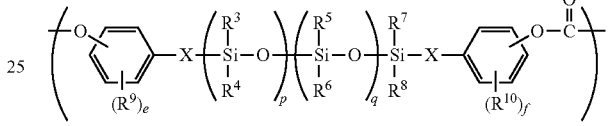

(In the above general formula [3], $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms or alkoxy group having 1 to 10 carbon atoms, "e" and "f" are each an integer of 1 to 4, "p" is a natural number, "q" is 0 or natural number, p+q is a natural number of 4 to 150, and X is a divalent aliphatic group having 2 to 8 carbon atoms.)

3. The resin composition in the above paragraph 1, wherein the content of a polydiorganosiloxane block represented by the following general formula [4] contained in the above general formula [3] is 1.0 to 10.0 wt % based on the total weight of the resin composition.

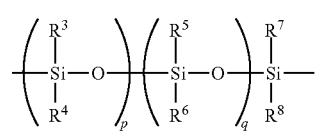

(In the above general formula [4], $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, "p" is a natural number, "q" is 0 or natural number, and p+q is a natural number of 4 to 150.)

4. The resin composition in the above paragraph 3, wherein p+q in the general formula [4] is a natural number of 4 to 120.
5. The resin composition in the above paragraph 1, wherein the component B is a polycarbonate-polydiorganosiloxane copolymer resin in which polydiorganosiloxane domains having an average size of 5 to 18 nm are existent in the matrix of a polycarbonate polymer.

6. The resin composition in the above paragraph 1, wherein the component C is a polyolefin resin having a density of 0.93 to 0.99 g/cm³.
7. The resin composition in the above paragraph 1 which comprises 0.01 to 1.0 part by weight of an organic metal salt-based compound (component D) based on 100 parts by weight of the resin component.
8. The resin composition in the above paragraph 7, wherein the component D is at least one organic alkali (earth) metal salt selected from the group consisting of alkali (earth) metal salts of a perfluoroalkylsulfonic acid, alkali (earth) metal salts of an aromatic sulfonic acid and alkali (earth) metal salts of an aromatic imide.
9. The resin composition in the above paragraph 1 which comprises 0.01 to 0.4 part by weight of polytetrafluoroethylene having fibril forming ability (component E) based on 100 parts by weight of the resin component.
10. The resin composition in the above paragraph 9, wherein the component E is branched polytetrafluoroethylene.
11. The resin composition in the above paragraph 1 which comprises 0.01 to 3 parts by weight of an ultraviolet absorbent (component F) based on 100 parts by weight of the resin component.
12. The resin composition in the above paragraph 1, wherein the amount of a low-molecular weight siloxane measured under heating at 150° C. for 30 minutes by a cryotrapping GC-MS method is not more than 1 μg/mg based on the weight of a material.
13. A molded article of the resin composition of any one of the above paragraphs 1 to 12.
14. The molded article in the above paragraph 13 which is coated.
15. The molded article in the above paragraph 13 which is the exterior member of a mobile information terminal.

BEST MODE FOR CARRYING OUT THE INVENTION

The present invention will be described in detail hereinunder.
(Component A: Polycarbonate Resin)

The polycarbonate resin (component A) is obtained by reacting a dihydroxy compound with a carbonate precursor by interfacial polycondensation or melt transesterification, by polymerizing a carbonate prepolymer by solid-phase transesterification, or by ring-opening polymerizing a cyclic carbonate compound.

The dihydroxy compound as used herein may be a bisphenol or an aliphatic diol if it is used as a dihydroxy component for an aromatic polycarbonate.

Examples of the bisphenol include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol and 1,3-bis(4-hydroxyphenyl)-5,7-dimethyladamantane.

Examples of the aliphatic diol include 2,2-bis-(4-hydroxycyclohexyl)-propane, 1,14-tetradecanediol, octaethylene glycol, 1,16-hexadecanediol, 4,4'-bis(2-hydroxyethoxy)biphenyl, bis{(2-hydroxyethoxy)phenyl}methane, 1,1-bis{(2-hydroxyethoxy)phenyl}ethane, 1,1-bis{(2-hydroxyethoxy)phenyl}-1-phenylethane, 2,2-bis{(2-hydroxyethoxy)phenyl}propane, 2,2-bis{(2-hydroxyethoxy)-3-methylphenyl}propane, 1,1-bis{(2-hydroxyethoxy)phenyl}-3,3,5-trimethylcyclohex ane, 2,2-bis{4-(2-hydroxyethoxy)-3,3'-biphenyl}propane, 2,2-bis{(2-hydroxyethoxy)-3-isopropylphenyl}propane, 2,2-bis{3-t-butyl-4-(2-hydroxyethoxy)phenyl}propane, 2,2-bis{(2-hydroxyethoxy)phenyl}butane, 2,2-bis{(2-hydroxyethoxy)phenyl}-4-methylpentane, 2,2-bis{(2-hydroxyethoxy)phenyl}octane, 1,1-bis{(2-hydroxyethoxy)phenyl}decane, 2,2-bis{3-bromo-4-(2-hydroxyethoxy)phenyl}propane, 2,2-bis{3,5-dimethyl-4-(2-hydroxyethoxy)phenyl}propane, 2,2-bis{3-cyclohexyl-4-(2-hydroxyethoxy)phenyl}propane, 1,1-bis{3-cyclohexyl-4-(2-hydroxyethoxy)phenyl}cyclohexa ne, bis{(2-hydroxyethoxy)phenyl}diphenylmethane, 9,9-bis{(2-hydroxyethoxy)phenyl}fluorene, 9,9-bis{4-(2-hydroxyethoxy)-3-methylphenyl}fluorene, 1,1-bis{(2-hydroxyethoxy)phenyl}cyclohexane, 1,1-bis{(2-hydroxyethoxy)phenyl}cyclopentane, 4,4'-bis(2-hydroxyethoxy)diphenyl ether, 4,4'-bis(2-hydroxyethoxy)-3,3'-dimethyldiphenyl ether, 1,3-bis[2-{(2-hydroxyethoxy)phenyl}propyl]benzene, 1,4-bis[2-{(2-hydroxyethoxy)phenyl}propyl]benzene, 1,4-bis{(2-hydroxyethoxy)phenyl}cyclohexane, 1,3-bis{(2-hydroxyethoxy)phenyl}cyclohexane, 4,8-bis{(2-hydroxyethoxy)phenyl}tricyclo[5.2.1.02,6]decane, 1,3-bis{(2-hydroxyethoxy)phenyl}-5,7-dimethyladamantane, 3,9-bis(2-hydroxy-1,1-dimethylethyl)-2,4,8,10-tetraoxaspiro(5,5)undecane, 1,4:3,6-dianhydro-D-sorbitol (isosorbide), 1,4:3,6-dianhydro-D-mannitol (isomannide) and 1,4:3,6-dianhydro-L-iditol (isoidide).

Out of these, aromatic bisphenols are preferred, and 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyldiphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are more preferred. 2,2-bis(4-hydroxyphenyl)propane, 1,1-bis(4-hydroxyphenyl)cyclohexane, 4,4'-sulfonyldiphenol and 9,9-bis(4-hydroxy-3-methylphenyl)fluorene are particularly preferred. 2,2-bis(4-hydroxyphenyl)propane having high strength and high durability is most preferred. They may be used alone or in combination of two or more.

The polycarbonate resin (component A) may be changed to a branched polycarbonate resin by using a branching agent in combination with the above dihydroxy compound.

A polyfunctional aromatic compound having 3 or more functional groups used for the branched polycarbonate resin is phloroglucin, phloroglucide or a trisphenol such as 4,6-dimethyl-2,4,6-tris(4-hydroxyphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol or 4-(4-[1,1-bis(4-hydroxyphenyl)ethyl]benzene)-α,α-dimethylbenzylphenol.

Tetra(4-hydroxyphenyl) methane, bis(2,4-dihydroxyphenyl) ketone, 1,4-bis(4,4-dihydroxytriphenylmethyl)benzene, or trimellitic acid, pyromellitic acid, benzophenone tetracarboxylic acid or acid chloride thereof may also be used. Out of these, 1,1,1-tris(4-hydroxyphenyl) ethane and 1,1,1-tris(3,5-dimethyl-4-hydroxyphenyl) ethane are preferred, and 1,1,1-tris(4-hydroxyphenyl) ethane is particularly preferred.

These polycarbonate resins (component A) are produced by reaction means known per se for producing an ordinary aromatic polycarbonate resin, for example, reacting an aromatic dihydroxy component with a carbonate precursor such as phosgene or a diester carbonate. A brief description is given of basic means for this production process.

A reaction in which phosgene is used as the carbonate precursor is generally carried out in the presence of an acid binder and a solvent. As the acid binder may be used an alkali metal hydroxide such as sodium hydroxide or potassium hydroxide, or an amine compound such as pyridine. As the solvent may be used a halogenated hydrocarbon such as methylene chloride or chlorobenzene. A catalyst such as a tertiary amine or a quaternary ammonium salt may be used to promote the reaction. The reaction temperature is generally 0 to 40° C., and the reaction time is several minutes to 5 hours.

A transesterification reaction in which a diester carbonate is used as the carbonate precursor is carried out by stirring the aromatic dihydroxy component and the diester carbonate in a predetermined ratio under heating in an inert gas atmosphere and distilling off the formed alcohol or phenol. The reaction temperature which differs according to the boiling point of the formed alcohol or phenol is generally 120 to 300° C. The reaction is completed while the formed alcohol or phenol is distilled off by setting a reduced pressure from the beginning. A catalyst which is generally used for a transesterification reaction may be used to promote the reaction.

Examples of the diester carbonate used in the above transesterification reaction include diphenyl carbonate, dinaphthyl carbonate, bis(diphenyl)carbonate, dimethyl carbonate, diethyl carbonate and dibutyl carbonate. Out of these, diphenyl carbonate is particularly preferred.

A terminal-sealing agent is preferably used in the polymerization reaction. The terminal-sealing agent is used to control the molecular weight. The obtained polycarbonate resin is superior in heat stability to a polycarbonate resin whose terminal is not sealed since its terminal is sealed. Examples of the terminal-sealing agent include monofunctional phenols represented by the following formulas [5] to [7].

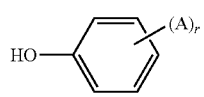

(5)

[In the above formula, A is a hydrogen atom, alkyl group having 1 to 9 carbon atoms, alkylphenyl group (alkyl moiety has 1 to 9 carbon atoms), phenyl group or phenylalkyl group (alkyl moiety has 1 to 9 carbon atoms), and "r" is an integer of 1 to 5, preferably 1 to 3.]

(6)

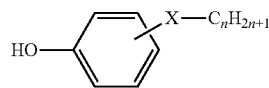

(7)

[In the above formulas, X is —R—O—, —R—CO—O— or —R—O—CO—. R is a single bond or a divalent aliphatic hydrocarbon group having 1 to 10, preferably 1 to 5 carbon atoms, and "n" is an integer of 10 to 50.]

Examples of the monofunctional phenol represented by the above general formula [5] include phenol, isopropylphenol, p-tert-butylphenol, p-cresol, p-cumylphenol, 2-phenylphenol, 4-phenylphenol and isooctylphenol.

The monofunctional phenols represented by the above general formulas [6] and [7] are phenols having a long-chain alkyl group or an aliphatic ester group as a substituent. When the terminal of the polycarbonate resin is sealed by using these, they not only serve as a terminal-sealing agent or a molecular weight control agent but also have the effects of improving the melt flowability of the resin to facilitate molding and reducing the water absorption coefficient of the resin. Therefore, they are preferably used.

The substituted phenol represented by the above general formula [6] is preferably a phenol in which "n" is 10 to 30, particularly preferably 10 to 26. Examples thereof include decylphenol, dodecylphenol, tetradecylphenol, hexadecylphenol, octadecylphenol, eicosylphenol, docosylphenol and triacontylphenol.

The substituted phenol of the above general formula [7] is suitably a compound in which X is —R—CO—O— and R is a single bond, preferably a compound in which "n" is 10 to 30, specifically 10 to 26. Examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

Out of these monofunctional phenols, monofunctional phenols represented by the above general formula [5] are preferred, alkyl-substituted or phenylalkyl-substituted phenols are more preferred, and p-tert-butylphenol, p-cumylphenol and 2-phenylphenol are particularly preferred. The monofunctional phenol terminal-sealing agent is desirably introduced into terminals which account for at least 5 mol %, preferably at least 10 mol % of the total of all the terminals of the obtained polycarbonate resin. The terminal-sealing agents may be used alone or in combination of two or more.

The polycarbonate resin (component A) may be a polyester carbonate obtained by copolymerizing an aromatic dicarboxylic acid, for example, terephthalic acid, isophthalic acid, naphthalenedicarboxylic acid or a derivative thereof as long as the object of the present invention is not inhibited.

The viscosity average molecular weight of the polycarbonate resin (component A) is preferably 13,000 to 25,000, more preferably 13,000 to 21,000, much more preferably 16,000 to 21,000, most preferably 16,000 to 20,000. When the molecular weight is higher than 25,000, melt viscosity becomes too high, whereby moldability may deteriorate, and when the molecular weight is lower than 13,000, there may occur a problem with mechanical strength.

The viscosity average molecular weight M as used in the present invention is obtained by first obtaining a specific viscosity calculated from the following equation from a solution prepared by dissolving 0.7 g of the polycarbonate resin in 100 ml of methylene chloride at 20° C. with an Ostwald viscometer and then inserting the obtained specific viscosity into the following equation.

Specific viscosity $(\eta_{sp})=(t-t_0)/t_0$

[$t_0$ is the number of seconds during which methylene chloride drops and t is the number of seconds during which a sample solution drops.]

$\eta_{sp}/c=[\eta]+0.45\times[\eta]^2 c$ ([$\eta$] represents an intrinsic viscosity)

$[\eta]=1.23\times10^{-4} M^{0.83}$ $c=0.7$

The total Cl (chlorine) content of the polycarbonate resin (component A) is preferably 0 to 200 ppm, more preferably 0 to 150 ppm. When the total Cl content of the polycarbonate resin exceeds 200 ppm, hue and heat stability degrade disadvantageously.

<Component B: Polycarbonate-Polydiorganosiloxane Copolymer Resin>

The polycarbonate-polydiorganosiloxane copolymer resin (component B) is preferably a polycarbonate-polydiorganosiloxane copolymer resin consisting of a polycarbonate block represented by the following general formula [1] and a polydiorganosiloxane block represented by the following general formula [3].

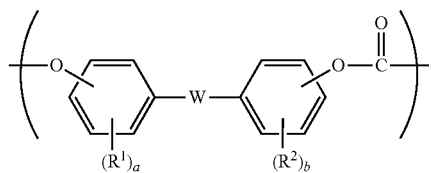

(1)

[In the above general formula [1], $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group, when there are a plurality of $R^1$'s and a plurality of $R^2$'s, they may be the same or different, "a" and "b" are each an integer of 1 to 4, and W is a single bond or at least one group selected from the group consisting of groups represented by the following general formulas [2].

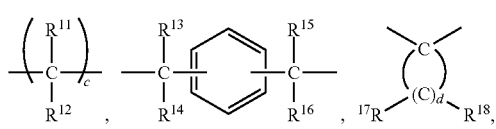

(2)

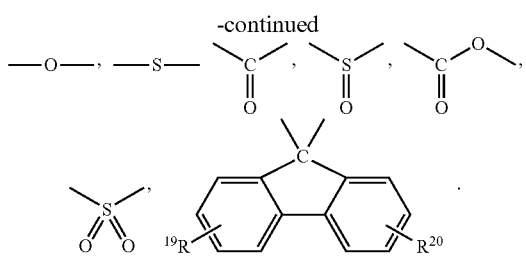

(In the above general formulas [2], $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms, $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group, when there are a plurality of each of them, they may be the same or different, "c" is an integer of 1 to 10, and "d" is an integer of 4 to 7.)]

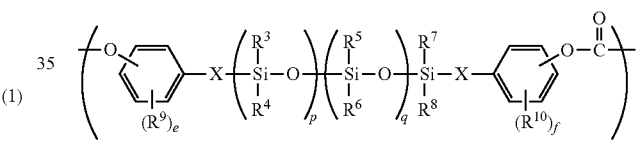

(3)

(In the above general formula [3], $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, $R^9$ and $R^{10}$ are each independently a hydrogen atom, halogen atom, alkyl group having 1 to 10 carbon atoms or alkoxy group having 1 to 10 carbon atoms, "e" and "f" are each an integer of 1 to 4, "p" is a natural number, "q" is 0 or natural number, p+q is a natural number of 4 to 150, and X is a divalent aliphatic group having 2 to 8 carbon atoms.)

Examples of a dihydric phenol (I) deriving the carbonate constituent unit represented by the above formula [1] include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl)propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyl diphenol, 4,4'-dihydroxydiphenyl sulfoxide, 4,4'-dihydroxydiphenyl sulfide, 2,2'-dimethyl-4,4'-sulfonyl diphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0²,⁶]decane, 4,4'-(1,3-adamantanediyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyl diphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are preferred.

2,2-bis(4-hydroxypheny)propane, 1,1-bis(4-hydroxyphenyl)cyclohexane, 4,4'-sulfonyldiphenol and 9,9-bis(4-hydroxy-3-methylphenyl)fluorene are more preferred. 2,2-bis(4-hydroxyphenyl)propane having high strength and high durability is most preferred. They may be used alone or in combination of two or more.

In the carbonate constituent unit represented by the above general formula [3], $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms. Preferably, they are each a hydrogen atom, alkyl group having 1 to 6 carbon atoms, or substituted or nonsubstituted aryl group having 6 to 12 carbon atoms. Particularly preferably, they are each a hydrogen atom, alkyl group having 1 to 6 carbon atoms or phenyl group.

$R^9$ and $R^{10}$ are each independently a hydrogen atom, halogen atom, alkyl group having 1 to 10 carbon atoms or alkoxy group having 1 to 10 carbon atoms. They are each preferably a hydrogen atom or alkyl group having 1 to 10 carbon atoms, particularly preferably a hydrogen atom or alkyl group having 1 to 4 carbon atoms.

As a dihydroxyaryl-terminated polydiorganosiloxane (II) deriving the carbonate constituent unit represented by the above formula [3], compounds represented by the following general formulas (I) are preferably used.

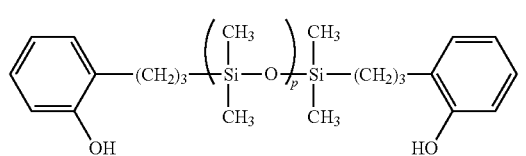
(I)

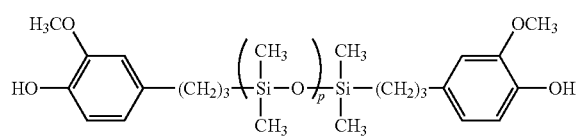

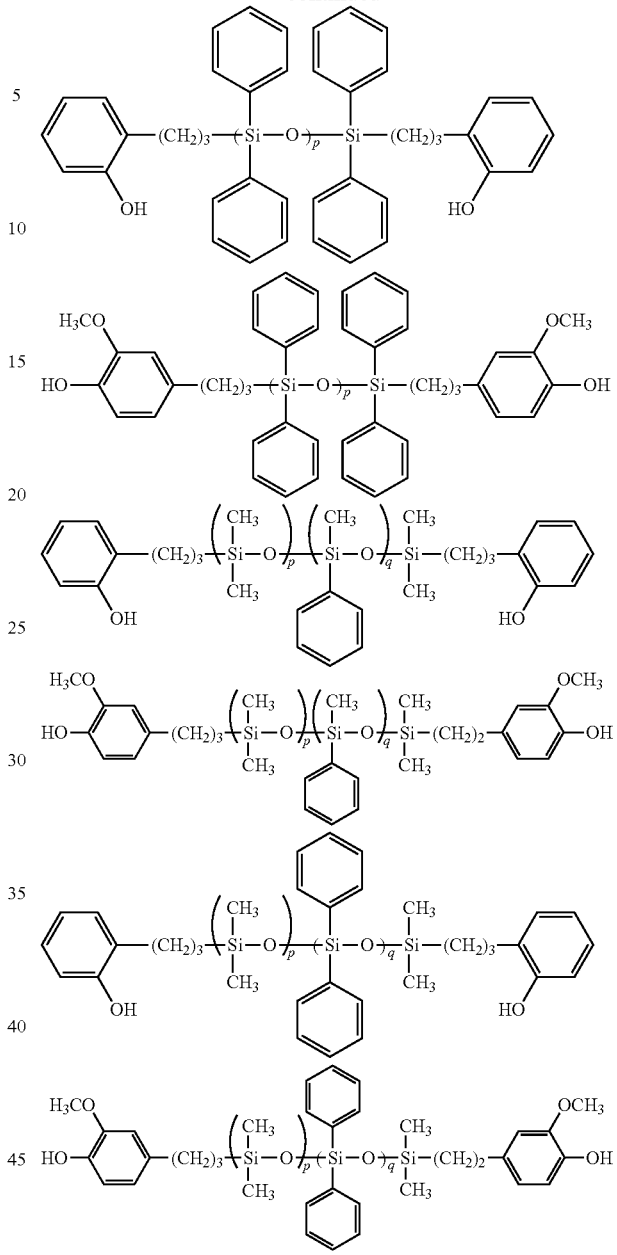

"p" and "q" which indicate the polymerization degree of diorganosiloxane are each a natural number, and p+q is a natural number of 4 to 150, preferably 4 to 120, more preferably 30 to 120, much more preferably 30 to 100, most preferably 30 to 60.

(Content of Polydiorganosiloxane Block)

The content of the polydiorganosiloxane block represented by the following general formula [4] contained in the above general formula [3] is preferably 1.0 to 12.0 wt %, more preferably 1.0 to 10.0 wt %, much more preferably 2.0 to 10.0 wt %, particularly preferably 2.0 to 8.0 wt %, most preferably 3.0 to 8.0 wt % based on the total weight of the resin composition. When the content of the polydiorganosiloxane component is lower than 1.0 wt %, low-temperature impact resistance and mechanical properties after coating become unsatisfactory, and when the content is higher than 10.0 wt %, a poor appearance and a coating defect may be produced at the time of molding disadvantageously. The polymerization degree of the diorganosiloxane and the content of the polydiorganosiloxane component can be calculated by $^1$H-NMR measurement.

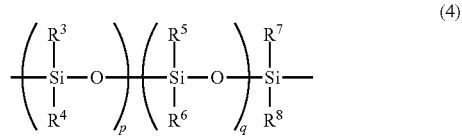

(4)

(In the above general formula [4], $R^3$, $R^4$, $R^5$, $R^6$, $R^7$ and $R^8$ are each independently a hydrogen atom, alkyl group having 1 to 12 carbon atoms, or substituted or nonsubstituted aryl group having 6 to 12 carbon atoms, "p" is a natural number, "q" is 0 or natural number, and p+q is a natural number of 4 to 150.)

(Average Domain Size)

The polycarbonate-polydiorganosiloxane copolymer resin (component B) is preferably a polycarbonate-polydiorganosiloxane copolymer resin in which polydiorganosiloxane domains having an average size of 5 to 18 nm are existent in the polycarbonate polymer matrix. The average size of the polydiorganosiloxane domains is preferably 5 to 15 nm, more preferably 5 to 12 nm, most preferably 8 to 12 nm. When this average size is smaller than 5 nm, low-temperature impact resistance may become unsatisfactory and when the average size is larger than 18 nm, a poor appearance and a coating defect may be produced at the time of molding disadvantageously.

The average size of the polydiorganosiloxane domains is evaluated by a small angle X-ray scattering (SAXS) method. The small angle X-ray scattering method is a method for measuring diffuse scattering/diffraction which occurs in a small-angle area having a scattering angle (2θ) of less than 10°. In this small angle X-ray scattering method, when there are areas as large as 1 to 100 nm which differ in electron density in a substance, the diffuse scattering of an X-ray is measured according to a difference in electron density. The particle diameter of an object to be measured is obtained based on this scattering angle and the scattering intensity.

In the case of an agglomeration structure that the polydiorganosiloxane domains are dispersed in the matrix of the polycarbonate-polydiorganosiloxane copolymer resin (component B), the diffuse scattering of an X-ray occurs due to a difference in electron density between the polycarbonate matrix and the polydiorganosiloxane domains. A small angle X-ray scattering profile is obtained by measuring scattering intensity I at each scattering angle (2θ) of less than 10° and simulation is carried out by using commercially available analytical software to obtain the average size of the polydiorganosiloxane domains from provisional particle sizes and a provisional particle size distribution model based on the assumption that the polydiorganosiloxane domains are spherical and there exist variations in particle size distribution. By the small angle X-ray scattering method, the average size of the polydiorganosiloxane domains dispersed in the polycarbonate polymer matrix which cannot be measured accurately by observation through a transmission electron microscope can be measured accurately and easily with high reproducibility.

A description is subsequently given of the process of producing the above preferred polycarbonate-polydiorganosiloxane copolymer resin (component B). A mixed solution of a chloroformate of the dihydric phenol (I) and/or a chloroformate compound containing a carbonate oligomer of the dihydric phenol (I) having a terminal chloroformate group is prepared by reacting the dihydric, phenol (I) with a chloroformate forming compound such as phosgene or a chloroformate of the dihydric phenol (I) in a mixed solution of a water-insoluble organic solvent and an alkali aqueous solution in advance. Phosgene is preferred as the chloroformate forming compound.

To form the chloroformate compound from the dihydric phenol (I), the whole amount of the dihydric phenol (I) deriving the carbonate constituent unit represented by the above general formula [1] may be used to form the chloroformate compound, or part of the dihydric phenol (I) may be added as a post-addition monomer in the subsequent interfacial polycondensation reaction as a reaction raw material. The post-addition monomer is added to accelerate the subsequent polycondensation reaction and does not need to be added when not required. This chloroformate compound forming reaction method is not particularly limited but preferably carried out in a solvent in the presence of an acid binder. A small amount of an antioxidant such as sodium sulfite or hydrosulfide may be further added as required and is preferably added. The amount of the chloroformate forming compound may be suitably adjusted in consideration of the stoichiometric proportion (equivalent) of the reaction. When phosgene which is a preferred chloroformate forming compound is used, gasified phosgene is preferably blown into the reaction system.

As the above acid binder may be used an alkali metal hydroxide such as sodium hydroxide or potassium hydroxide, an alkali metal carbonate such as sodium carbonate or potassium carbonate, an organic base such as pyridine, or a mixture thereof.

The amount of the acid binder may also be suitably determined in consideration of the stoichiometric proportion (equivalent) of the reaction. More specifically, 2 equivalents or a little more than that of the acid binder is preferably used based on 1 mole (generally, 1 mole is equivalent to 2 equivalents) of the dihydric phenol (I) used to form the chloroformate compound of the dihydric phenol (I).

As the above solvent, various solvents which are inactive to the reaction and used to produce known polycarbonates may be used alone or as a mixture. Typical examples thereof include hydrocarbon solvents such as xylene and halogenated hydrocarbon solvents such as methylene chloride and chlorobenzene. Halogenated hydrocarbon solvents such as methylene chloride are particularly preferably used.

The pressure in the chloroformate compound forming reaction is not particularly limited and may be normal, increased or reduced pressure. In general, it is advantageous that the reaction should be carried out under normal pressure. The reaction temperature is selected from a range of −20 to 50° C. Since heat is generated by the reaction in most cases, water cooling or ice cooling is desirably carried out. Since the reaction time is affected by other conditions, it cannot be specified unconditionally but generally 0.2 to 10 hours.

The pH range in the chloroformate compound forming reaction can be set by making use of known interfacial reaction conditions and is generally adjusted to not less than 10.

In the production of the polycarbonate-polydiorganosiloxane copolymer resin (component B), a mixed solution of a chloroformate of the dihydric phenol (I) and a chloroformate compound containing a carbonate oligomer of the dihydric phenol (I) having a terminal chloroformate group is prepared. Thereafter, the dihydroxyaryl-terminated polydiorganosiloxane (II) deriving the carbonate constituent unit represented by the general formula [3] is added at a rate of not more than 0.01 mole/min based on 1 mole of the dihydric phenol (I) charged to prepare the above mixed solution while the mixed solution is stirred to carry out the interfacial polycondensation of the dihydroxyaryl-terminated polydiorganosiloxane (II) and the chloroformate compound so as to obtain a polycarbonate-polydiorganosiloxane copolymer resin.

The polycarbonate-polydiorganosiloxane copolymer resin (component B) can be changed to a branched polycarbonate-polydiorganosiloxane copolymer resin by using a branching agent in combination with the above dihydric phenol-based compound. Examples of a polyfunctional aromatic compound having 3 or more functional groups used for the branched polycarbonate resin include phloroglucin, phloroglucide and trisphenols such as 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzyl phenol.

Tetra(4-hydroxyphenyl)methane, bis(2,4-dihydroxyphenyl)ketone, 1,4-bis(4,4-dihydroxytriphenylmethyl)benzene, trimellitic acid, pyromellitic acid and benzophenonetetracarboxylic acid may also be used. Further, acid chlorides thereof may also be used. Out of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The process for producing the branched polycarbonate-polydiorganosiloxane copolymer resin may be one in which a branching agent is contained in the mixed solution during a reaction for forming the chloroformate compound, or one in which a branching agent is added during the interfacial polycondensation reaction after the end of the forming reaction. The content of the carbonate constituent unit derived from the branching agent is preferably 0.005 to 1.5 mol %, more preferably 0.01 to 1.2 mol %, particularly preferably 0.05 to 1.0 mol % based on the total amount of all the carbonate constituent units constituting the copolymer resin. The amount of the branch structure can be calculated by $^1$H-NMR measurement.

Although the pressure in the polycondensation reaction system may be reduced, normal or increased pressure, the reaction can be advantageously carried out under normal pressure or the own pressure of the reaction system. The reaction temperature is selected from a range of −20 to 50° C. Since heat is generated by polymerization in most cases, water cooling or ice cooling is desirably carried out. Since the reaction time differs according to the reaction temperature and other conditions, it cannot be specified unconditionally but generally 0.5 to 10 hours. According to the circumstances, a polycarbonate-polydiorganosiloxane copolymer resin having a desired reduced viscosity [$\eta_{sp}$/c] can also be obtained by subjecting the obtained polycarbonate-polydiorganosiloxane copolymer resin to a physical treatment (such as mixing or fractionation) and/or a chemical treatment (such as a polymer reaction, crosslinking or partial decomposition). A polycarbonate-polydiorganosiloxane copolymer resin having desired purity (refining degree) can be collected by subjecting the obtained reaction product (crude product) to various known post-treatments such as separation and refinement.

The viscosity average molecular weight of the polycarbonate-polydiorganosiloxane copolymer resin (component B) is preferably 13,000 to 25,000, more preferably 13,000 to 21,000, much more preferably 16,000 to 21,000, most preferably 16,000 to 20,000. When the molecular weight is higher than 25,000, melt viscosity becomes too high, whereby moldability may deteriorate, and when the molecular weight is lower than 13,000, there may occur a problem with mechanical strength.

The viscosity average molecular weight of the polycarbonate-polydiorganosiloxane copolymer resin (component B) is calculated as follows. The viscosity average molecular weight Mv is obtained by first obtaining a specific viscosity ($\eta_{isp}$) calculated by the following equation from a solution prepared by dissolving 0.7 g of the polycarbonate-polydiorganosiloxane copolymer resin in 100 ml of methylene chloride at 20° C. with an Ostwald viscometer and then inserting the obtained specific viscosity ($\eta_{sp}$) into the following equation.

Specific viscosity $(\eta_{sp})=(t-t_0)/t^0$

[$t^0$ is the number of seconds during which methylene chloride drops and t is the number of seconds during which a sample solution drops]

$\eta_{sp}/c=[\eta]+0.45\times[\eta]^{2c}$ ([η] represents an intrinsic viscosity)

$[\eta]=1.23\times10^{-4}$ Mv$^{0.83}$ $c=0.7$

The content of the component B which is adjusted to ensure that the content of the polydiorganosiloxane block represented by the above general formula [4] in the component B falls within the above preferred range is preferably 10 to 90 parts by weight, more preferably 10 to 80 parts by weight, much more preferably 10 to 60 parts by weight, particularly preferably 20 to 60 parts by weight, most preferably 40 to 60 parts by weight based on 100 parts by weight of the resin component.

(Component C: Polyolefin Resin)

The polyolefin resin (component C) is preferably a polyolefin resin containing a recurring unit represented by the following general formula (X), as exemplified by polyethylene, polypropylene, poly-1-butene, poly-1-pentene, poly-1-hexene, poly-4-methyl-1-pentene, poly-1-heptene, poly-1-octene and copolymers thereof. Out of these, polyethylene and polypropylene are preferred, and polyethylene is particularly preferred.

[In the above general formula (X), $R^{xx}$ is a hydrogen atom or linear hydrocarbon group having 1 to 10 carbon atoms.]

The weight average molecular weight of the polyolefin is preferably 1,000 to 1,000,000, particularly preferably 3,000 to 300,000.

The density of the polyolefin resin (component C) is preferably 0.93 to 0.99 g/cm$^3$, more preferably 0.93 to 0.97 g/cm$^3$, most preferably 0.94 to 0.97 g/cm$^3$. When the density of the polyolefin resin falls within the above range, excellent low-temperature impact resistance and mechanical properties after coating can be obtained.

The acid value (JIS K 0070) of the polyolefin resin (component C) is preferably less than 20 mg/KOH, more preferably less than 10 mg/KOH, much more preferably less than 5 mg/KOH, most preferably less than 3 mg/KOH. When the acid value is not less than 20 mg/KOH, low-temperature impact resistance and mechanical properties after coating may become unsatisfactory disadvantageously.

The content of the polyolefin resin (component C) is 0.5 to 2.5 parts by weight, preferably 0.5 to 2.0 parts by weight, more preferably 0.5 to 1.5 parts by weight based on 100 parts by weight of the resin component. When the content is lower than 0.5 part by weight, low-temperature impact resistance and mechanical properties after coating become unsatisfactory and when the content is higher than 2.5 parts by weight, impact properties become unsatisfactory and a poor appearance and a coating defect are produced at the time of molding.

(Component D: Organic Metal Salt-based Compound)

The resin composition may comprise an organic metal salt-based compound (component D). The component D is (i) an alkali (earth) metal salt of a perfluoroalkylsulfonic acid, (ii) an alkali (earth) metal salt of an aromatic sulfonic acid, or (iii) an alkali (earth) metal salt of an aromatic imide.

The alkali (earth) metal means an alkali metal or alkali earth metal. Examples of the alkali metal include lithium, sodium, potassium, rubidium and cesium. Examples of the alkali earth metal include beryllium, magnesium, calcium, strontium and barium.

(Alkali (Earth) Metal Salt of Perfluoroalkylsulfonic Acid (i))

The alkali (earth) metal salt of a perfluoroalkylsulfonic acid (i) is a metal salt of a perfluoroalkylsulfonic acid and an alkali metal or alkali earth metal. The metal salt is preferably an alkali metal salt. Out of these alkali metals, rubidium and cesium having a larger ion radius are preferred when the requirement for transparency is higher. However, as they cannot be used for all purposes and it is difficult to refine them, they may become disadvantageous in terms of cost. Meanwhile, metals having a smaller ion radius such as lithium and sodium may become disadvantageous in terms of flame retardancy. In consideration of these, an alkali metal contained in the sulfonic acid alkali metal salt may be selected but a sulfonic acid potassium salt having good balance among properties is most preferred in all aspects. This potassium salt and a sulfonic acid alkali metal salt comprising another alkali metal may be used in combination.

Examples of the alkali metal salt of a perfluoroalkylsulfonic acid (i) include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more.

The number of carbon atoms of the perfluoroalkyl group is preferably 1 to 18, more preferably 1 to 10, much more preferably 1 to 8. Out of these, potassium perfluorobutanesulfonate is particularly preferred.

In general, a fluoride ion ($F^-$) is contained in the alkali (earth) metal salt of a perfluoroalkylsulfonic acid (i) comprising an alkali metal in no small measure. Since the existence of the fluoride ion may cause the deterioration of flame retardancy, it is preferably reduced as much as possible. The content of the fluoride ion can be measured by ion chromatography. The content of the fluoride ion is preferably not more than 100 ppm, more preferably not more than 40 ppm, particularly preferably not more than 10 ppm. It is advantageously not less than 0.2 ppm from the viewpoint of production efficiency.

The alkali (earth) metal salt of a perfluoroalkylsufonic acid (i) whose fluoride ion content has been reduced can be produced by employing a known production process such as one in which the content of the fluoride ion in the raw material is reduced when a fluorine-containing organic metal salt is produced, one in which hydrogen fluoride obtained by a reaction is removed by a gas generated at the time of the reaction or heating, or one in which the amount of the fluoride ion is reduced by purification means such as recrystallization and reprecipitation in the production of a fluorine-containing organic metal salt. Since an organic metal salt-based flame retardant relatively easily dissolves in water, it is preferably produced by using ion exchange water, especially water having an electric resistance of not less than 18 MΩ·cm, that is, an electric conductivity of about not more than 0.55 µS/cm to dissolve and clean it at a temperature higher than normal temperature and then cooling it for recrystallization.

(Alkali (Earth) Metal Salt of Aromatic Sulfonic Acid (ii))

The alkali (earth) metal salt of an aromatic sulfonic acid (ii) is a metal salt of an aromatic sulfonic acid and an alkali metal or alkali earth metal. The number of carbon atoms of the aromatic group is preferably 7 to 50, more preferably 7 to 40.

Examples of the alkali (earth) metal salt of an aromatic sulfonic acid (ii) include disodium diphenylsulfide-4,4'-disulfonate, dipotassium diphenylsulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenylene oxide)polysulfonate, polysodium poly(1,3-phenylene oxide)polysulfonate, polysodium poly(1,4-phenylene oxide)polysulfonate, polypotassium poly(2,6-diphenylphenylene oxide)polysulfonate, lithium poly(2-fluoro-6-butylphenylene oxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate, and formalin condensate of sodium anthracenesulfonate.

Out of these alkali (earth) metal salts of an aromatic sulfonic acid (ii), potassium salts are preferred. Out of these alkali (earth) metal salts of an aromatic sulfonic acid, potassium diphenylsulfone-3-sulfonate and dipotassium diphenylsulfone-3,3'-disulfonate are more preferred, and a mixture of these (the weight ratio of the former to the latter is 15/85 to 30/70) is particularly preferred. (alkali (earth) metal salt of aromatic imide (iii))

The alkali (earth) metal salt of an aromatic imide (iii) is a metal salt of an aromatic imide and an alkali metal or alkali earth metal.

(Others)

Other organic metal salt-based compounds are preferably alkali (earth) metal salts of a sulfuric acid ester and alkali (earth) metal salts of an aromatic sulfonamide.

The alkali (earth) metal salts of a sulfuric acid ester include alkali (earth) metal salts of a sulfuric acid ester of a monohydric and/or polyhydric alcohol. Examples of the sulfuric acid ester of a monohydric and/or polyhydric alcohol include methyl sulfuric acid esters, ethyl sulfuric acid esters, lauryl sulfuric acid esters, hexadecyl sulfuric acid esters, sulfuric acid esters of a polyoxyethylene alkylphenyl ether, mono-, di-, tri- and tetra-sulfuric acid esters of pentaerythritol, sulfuric acid esters of monoglyceride laurate, sulfuric acid esters of monoglyceride palmitate and sulfuric acid esters of monoglyceride stearate. Out of these alkali (earth) metal salts of sulfuric acid esters, alkali (earth) metal salts of a lauryl sulfuric acid ester are preferred.

The alkali (earth) metal salts of an aromatic sulfonamide include alkali (earth) metal salts of saccharin, N-(p-tolylsulfonyl)-p-toluenesulfoimide, N—(N'-benzylaminocarbonyl)sulfanilimide and N-(phenylcarboxyl)sulfanilimide.

The content of the component D is preferably 0.01 to 1.0 part by weight, more preferably 0.01 to 0.5 part by weight, much more preferably 0.01 to 0.3 part by weight, particularly preferably 0.03 to 0.15 part by weight based on 100 parts by weight of the resin component. When the content is lower than 0.01 part by weight, flame retardancy does not improve and when the content is higher than 1 part by weight, tracking resistance degrades.

(Component E: Polytetrafluoroethylene Having Fibril Forming Ability)

Polytetrafluoroethylene having fibril forming ability (fibrillated PTFE) (component E) may be fibrillated PTFE alone or a polytetrafluoroethylene-based mixture of fibrillated PTFE, that is, fibrillated PTFE particles and an organic polymer.

The fibrillated PTFE has an extremely high molecular weight and tends to become fibrous through the bonding of PTFE's by an external function such as shear force. The number average molecular weight thereof is 1,500,000 to several tens of million. The lower limit of the number average molecular weight is preferably 3,000,000. The number average molecular weight is calculated based on the melt viscosity of polytetrafluoroethylene at 380° C. as disclosed by JP-A 6-145520. That is, the fibrillated PTFE as the component E has a melt viscosity at 380° C. measured by the method disclosed by the above publication of $10^7$ to $10^{13}$ poise, preferably $10^8$ to $10^{12}$ poise.

The PTFE in a solid form or an aqueous dispersion form may be used. A PTFE mixture of the fibrillated PTFE and another resin may also be used to improve dispersibility in a resin and further obtain high flame retardancy and mechanical properties. As disclosed by JP-A 6-145520, a PTFE mixture containing the fibrillated PTFE as the core and low-molecular weight polytetrafluoroethylene as the shell is preferably used as well. Commercially available products of the fibrillated PTFE include the TEFLON (registered trademark) 6J of Du Pont-Mitsui Fluorochemicals Co., Ltd. and the POLYFLON MPA FA500 and F-201L of Daikin Industries, Ltd.

The fibrillated PTFE mixture obtained by (1) a method in which a fibrillated PTFE aqueous dispersion and an aqueous dispersion or solution of an organic polymer are mixed together and co-precipitation is carried out to obtain a coaggregated mixture (disclosed by JP-A 60-258263 and JP-A 63-154744), (2) a method in which a fibrillated PTFE aqueous dispersion and dried organic polymer particles are mixed together (disclosed by JP-A 4-272957), (3) a method in which a fibrillated PTFE aqueous dispersion and an organic polymer particle solution are uniformly mixed together and their media are removed from the obtained mixture at the same time (disclosed by JP-A 06-220210 and JP-A 08-188653), (4) a method in which a monomer for forming an organic polymer is polymerized in a fibrillated PTFE aqueous dispersion (disclosed by JP-A 9-95583), or (5) a method in which a PTFE aqueous dispersion and an organic polymer dispersion are uniformly mixed together and a vinyl-based monomer is further polymerized in the mixed dispersion to obtain a mixture (disclosed by JP-A 11-29679) may be used.

The content of the fibrillated PTFE in the mixture is preferably 1 to 95 wt %, more preferably 10 to 90 wt %, most preferably 20 to 80 wt % based on 100 wt % of the mixture. When the content of the fibrillated PTFE in the mixture falls within the above range, the high dispersibility of the fibrillated PTFE can be obtained.

Commercially available products of these fibrillated PTFE mixtures include the METABLEN A series such as METABLEN A3000 (trade name), METABLEN A3700 (trade name) and METABLEN A3800 (trade name) of Mitsubishi Rayon Co., Ltd., the SN3705 (trade name) of Shine Polymer Technology Co., Ltd., and the BLENDEX B449 (trade name) of GE Specialty Chemicals Co., Ltd.

The fibrillated PTFE is preferably branched polytetrafluoroethylene. When the polytetrafluoroethylene contained is branched polytetrafluoroethylene and the amount of polytetrafluoroethylene added is made small, a satisfactory dripping inhibition effect is obtained. Commercially available products of the polytetrafluoroethylene having fibril forming ability and comprising branched polytetrafluoroethylene include the SN3306 (trade name) and SN3300B7 (trade name) of Shine Polymer Technology Co., Ltd.

The content of the component E is preferably 0.01 to 0.4 part by weight, more preferably 0.1 to 0.4 part by weight, much more preferably 0.1 to 0.2 part by weight, most preferably 0.1 to 0.18 part by weight based on 100 parts by weight of the resin component. The content of the component E represents the net amount of a dripping inhibitor and the net amount of PTFE in the case of a PTFE mixture. When the content is lower than 0.01 part by weight, high flame retardancy may not be obtained and when the content is higher than 0.4 part by weight, mechanical properties may deteriorate.

(Component F: Ultraviolet Absorbent)

Examples of a benzophenone-based ultraviolet absorbent (component F) include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of a benzotriazole-based ultraviolet absorbent include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'- methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one) and 2-[2-hydroxy-3-(3,4,5,6-tetrahydrophthalimidomethyl)-5-m ethylphenyl]benzotriazole. Polymers having a 2-hydroxyphenyl-2H-benzotriazole skeleton such as a copolymer of 2-(2'-hydroxy-5-methacryloxyethylphenyl)-2H-benzotriazol e and a vinyl-based monomer copolymerizable with that monomer and a copolymer of 2-(2'-hydroxy-5-acryloxyethylpheny)-2H-benzotriazole and a vinyl-based monomer copolymerizable with that monomer are also included.

Examples of a hydroxyphenyltriazine-based ultraviolet absorbent include 2-(4,6-diphenyl-1,3,5-triazine-2-yl)-5-hexyloxyphenol, 2-(4,6-diphenyl-1,3,5-triazine-2-yl)-5-methyloxyphenol, 2-(4,6-diphenyl-1,3,5-triazine-2-yl)-5-ethyloxyphenol, 2-(4,6-diphenyl-1,3,5-triazine-2-yl)-5-propyloxyphenol and 2-(4,6-diphenyl-1,3,5-triazine-2-yl)-5-butyloxyphenol. Further, compounds having a 2,4-dimethylphenyl group in place of the phenyl groups of the above compounds, such as 2-(4,6-bis(2,4-dimethylphenyl)-1,3,5-triazine-2-yl)-5-hexyloxyphenol, are also included.

Examples of a cyclic iminoester-based ultraviolet absorbent include 2,2'-p-phenylenebis(3,1-benzoxazine-4-one), 2,2'-m-phenylenebis(3,1-benzoxazine-4-one) and 2,2'-p,p'-diphenylenebis(3,1-benzoxazine-4-one).

Examples of a cyanoacrylate-based ultraviolet absorbent include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The above ultraviolet absorbent may be a polymer type ultraviolet absorbent obtained by copolymerizing an ultraviolet absorbing monomer and/or an optically stable monomer which has the structure of a monomer compound able to be radically polymerized with a monomer such as an alkyl (meth)acrylate. Preferred examples of the above ultraviolet absorbing monomer include compounds having a benzotriazole skeleton, a benzophenone skeleton, a triazine skeleton, a cyclic iminoester skeleton or a cyanoacrylate skeleton in the ester substituent of a (meth)acrylic acid ester. Out of these, benzotriazole-based and hydroxyphenyltriazine-based compounds are preferred from the viewpoint of ultraviolet absorbing ability, and cyclic imionoester-based and cyanoacrylate-based compounds are preferred from the viewpoints of heat resistance and hue. Examples of the above ultraviolet absorbent include the KEMISORB 79 of Chemipro Kasei Kaisha, Ltd. and the Tinuvin 234 of BASF Japan Ltd. The above ultraviolet absorbents may be used alone or in combination of two or more.

The content of the component F is preferably 0.01 to 3 parts by weight, more preferably 0.01 to 1 part by weight, much more preferably 0.05 to 1 part by weight, particularly preferably 0.05 to 0.5 part by weight based on 100 parts by weight of the resin component. When the content is lower than 0.01 part by weight, weather resistance may become unsatisfactory and when the content is higher than 3 parts by weight, flame retardancy may become unsatisfactory.

(Other Additives)

Additives which are used to improve heat stability, optical stability (ultraviolet stability), flame retardancy and design are used to improve these properties of the resin composition of the present invention advantageously. A detailed description is subsequently given of these additives.

(1) Heat Stabilizer

The resin composition of the present invention may comprise various known stabilizers. The stabilizers include phosphorus-based stabilizers and hindered phenol-based antioxidants.

(i) Phosphorus-Based Stabilizer

Preferably, the resin composition of the present invention comprises a phosphorus-based stabilizer as long as its hydrolyzability is not promoted. The phosphorus-based stabilizer improves heat stability at the time of production or molding as well as mechanical properties, hue and molding stability. The phosphorus-based stabilizer is selected from phosphorous acid, phosphoric acid, phosphonous acid, phosphonic acid and esters thereof, and a tertiary phosphine.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite and dicyclohexyl pentaerythritol diphosphite.

Other phosphite compounds which react with a dihydric phenol and have a cyclic structure may also be used. The phosphite compounds include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite and 2,2'-ethylidenebis(4-methyl-6-tert-butylphenyl)(2-tert-butyl-4-methylphenyl)phosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Out of these, triphenyl phosphate and trimethyl phosphate are preferred.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenylphosphonite, bis(2,4-di-tert-butylphenyl)-3-phenyl-phenylphosphonite, bis(2,6-di-n-butylphenyl)-3-phenyl-phenyl phosphonite, bis(2,6-di-tert-butylphenyl)-4-phenyl-phenyl phosphonite and bis(2,6-di-tert-butylphenyl)-3-phenyl-phenyl phosphonite. Out of these, tetrakis(di-tert-butylphenyl)-biphenylene diphosphonites and bis(di-tert-butylphenyl)-phenyl-phenyl phosphonites are preferred, and tetrakis(2,4-di-tert-butylphenyl)-biphenylene diphosphonites and bis(2,4-di-tert-butylphenyl)-phenyl-phenyl phosphonites are preferred. The phosphonite compound may be and is preferably used in combination with the above phosphite compound having an aryl group substituted for two or more alkyl groups.

Examples of the phosphonate compound include dimethylbenzene phosphonate, diethylbenzene phosphonate and dipropylbenzene phosphonate.

Examples of the tertiary phosphine include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphtyl phosphine and diphenylbenzyl phosphine. Triphenyl phosphine is particularly preferred as the tertiary phosphine.

The above phosphorus-based stabilizers may be used alone or in combination of two or more. Out of these phosphorus-based stabilizers, alkyl phosphate compounds typified by trimethyl phosphate are preferably used. A combination of an alkylphosphate compound and a phosphite compound and/or a phosphonite compound is also preferred.

(ii) Hindered Phenol-Based Stabilizer

The resin composition of the present invention may further comprise a hindered phenol-based stabilizer. The hindered phenol-based stabilizer has the effect of suppressing the deterioration of hue at the time of molding or during long-time use.

Examples of the hindered phenol-based stabilizer include α-tocopherol, butylhydroxytoluene, sinapyl alcohol, vitamin E, n-octadecyl-β-(4'-hydroxy-3',5'-di-tert-butylphenol) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-a-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl)pr opionate, 1,6-hexanediolbis[3-(3,5-di-tert-butyl-4-hydroxyphenyl)propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl)propionyloxy]-1,1-dimethylethyl}-2,4,8, 10-tetraoxaspiro[5,5] undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl] hydrazine, 1,1,3-tris(2-methyl-4-hydroxy-5-tert-butylphenyl) butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2 [3 (3,5-di-tert-butyl-4-hydroxyphenyl)propionyloxy]ethyl isocyanurate and tetrakis [methylene-3-(3',5'-di-tert-butyl-4-hydroxyphenyl)propionate]methane.

All of them are easily acquired. The above hindered phenol-based stabilizers may be used alone or in combination of two or more. The contents of the phosphorus-based stabilizer and the hindered phenol-based stabilizer are each preferably 0.0001 to 1 part by weight, more preferably 0.001 to 0.5 part by weight, much more preferably 0.005 to 0.3 part by weight based on 100 parts by weight of the resin component.

(iii) Heat Stabilizer Except for the Above Stabilizers

The resin composition of the present invention may comprise another heat stabilizer except for the above phosphorus-based stabilizer and the hindered phenol-based stabilizer. A preferred example of the heat stabilizer is a lactone-based stabilizer typified by a reaction product of 3-hydroxy-5,7-di-tert-butyl-furan-2-one and o-xylene. This stabilizer is detailed in JP-A 7-233160. This compound is marketed under the name of Irganox HP-136 (trademark, manufactured by CIBA SPECIALTY CHEMICALS INC.) and may be used. A stabilizer prepared by mixing together the above compound, a phosphite compound and a hindered phenol compound is commercially available. A preferred example of the stabilizer is the Irganox HP-2921 of CIBA SPECIALTY CHEMICALS INC. The content of the lactone-based stabilizer is preferably 0.0005 to 0.05 part by weight, more preferably 0.001 to 0.03 part by weight based on 100 parts by weight of the resin component.

Other stabilizers include sulfur-containing stabilizers such as pentaerythritol tetrakis(3-mercaptopropionate), pentaerythritol tetrakis(3-laurylthiopropionate) and glycerol-3-stearyl thiopropionate. The content of the sulfur-containing stabilizer is preferably 0.001 to 0.1 part by weight, more preferably 0.01 to 0.08 part by weight based on 100 parts by weight of the resin component.

The resin composition of the present invention may comprise an epoxy compound as required. The epoxy compound is used to suppress the corrosion of a metal mold, and all epoxy compounds having an epoxy functional group may be basically used. Preferred examples of the epoxy compound include 3,4-epoxycyclohexylmethyl-3',4'-epoxycyclohexyl carboxylate, 1,2-epoxy-4-(2-oxiranyl)cyclohexane adduct of 2,2-bis(hydroxymethyl)-1-butanol, copolymer of methyl methacrylate and glycidyl methacrylate, and copolymer of styrene and glycidyl methacrylate. The content of the epoxy compound is preferably 0.003 to 0.2 part by weight, more preferably 0.004 to 0.15 part by weight, much more preferably 0.005 to 0.1 part by weight based on 100 parts by weight of the resin component.

(II) Flame Retardant

The resin composition of the present invention may comprise a compound except for the component D, which is known as a flame retardant for polycarbonate resins. Although flame retardancy is improved by mixing this compound, antistatic properties, flowability, stiffness and heat stability are also improved based on the properties of the compound. Examples of the flame retardant include (i) organic phosphorus-based flame retardants (such as organic group-containing monophosphate compounds, phosphate oligomer compounds, phosphonate oligomer compounds, phosphonitrile oligomer compounds and phosphonic acid amide compounds) and (ii) silicone-based flame retardants comprising a silicone compound.

(i) Organic Phosphorus-Based Flame Retardant

The organic phosphorus-based flame retardant is preferably an aryl phosphate compound. This is because the phosphate compound is generally excellent in hue. Since the phosphate compound has a plasticizing effect, it can improve moldability advantageously. Various phosphate compounds which have been known as flame retardants may be used as the phosphate compound. The content of the organic phosphorus-based flame retardant is preferably 0.01 to 20 parts by weight, more preferably 2 to 10 parts by weight, much more preferably 2 to 7 parts by weight based on 100 parts by weight of the resin component.

(ii) Silicone-Based Flame Retardant

A silicone compound which is used as the silicone-based flame retardant improves flame retardancy through its chemical reaction at the time of combustion. Various compounds which have been proposed as flame retardants for aromatic polycarbonate resins may be used as the compound.

It is considered that the silicone compound provides a flame retarding effect to a polycarbonate resin by bonding itself or to a component derived from the resin at the time of combustion to form a structure or through a reduction reaction at the time of forming the structure. Therefore, it is preferred that the silicone compound should contain a group which is highly active in the reaction. More specifically, it is preferred that the silicone compound should contain a predetermined amount of at least one group selected from alkoxy group and hydrogen (that is, Si—H group).

The content of the group (alkoxy group, Si—H group) is preferably 0.1 to 1.2 mol/100 g, more preferably 0.12 to 1 mol/100 g, much more preferably 0.15 to 0.6 mol/100 g. This content is obtained by measuring the amount of hydrogen or an alcohol generated per unit weight of the silicone compound by an alkali decomposition method. The alkoxy group is preferably an alkoxy group having 1 to 4 carbon atoms, particularly preferably methoxy group. The structure of the silicone compound is generally constituted by combining the following four different siloxane units arbitrarily.

That is, they are:

M units: monofunctional siloxane units such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ and $(CH_3)(C_6H_5)(CH_2=CH)SiO_{1/2}$ D units: bifunctional siloxane units such as $(CH_3)_2SiO$, $H(CH_3)SiO$, $H_2SiO$, $H(C_6H_5)SiO$, $(CH_3)(CH_2=CH)SiO$ and $(C_6H_5)_2SiO$ T units: trifunctional siloxane units such as $(CH_3)SiO_{3/2}$, $(C_3H_7)SiO_{3/2}$, $HSiO_{3/2}$, $(CH_2=CH)SiO_{3/2}$ and $(C_6H_5)SiO_{3/2}$, Q unit: tetrafunctional siloxane unit represented by $SiO_2$ The structure of the silicone compound used as the silicone-based flame retardant is represented by Dn, Tp, MmDn, MmTp, MmQq, MmDnTp, MmDnQq, MmTpQq, MmDnTpQq, DnTp, DnQq or DnTpQq. Out of these, the structure of the silicone compound is represented by preferably MmDn, MmTp, MmDnTp or MmDnQq, more preferably MmDn or MmDnTp.

The coefficients m, n, p and q in the above rational formulae are each an integer of not less than 1, indicating the polymerization degree of each siloxane unit, and the total of these coefficients in the formulae is the average polymerization degree of the silicone compound. The average polymerization degree is preferably 3 to 150, more preferably 3 to 80, much more preferably 3 to 60, particularly preferably 4 to 40. Within the more preferred range, higher flame retardancy is obtained. As will be described hereinafter, a silicone compound containing a predetermined amount of an aromatic group is also excellent in transparency and hue. As a result, good reflected light is obtained. When anyone of m, n, p and q is not less than 2, two or more of the siloxane units having this coefficient differ in the hydrogen atom or organic residue bonded thereto.

The silicone compound may have a linear or branched structure. The organic residue bonded to the silicon atom has preferably 1 to 30 carbon atoms, more preferably 1 to 20 carbon atoms. Examples of the organic residue include alkyl groups such as methyl group, ethyl group, propyl group, butyl group, hexyl group and decyl group, cycloalkyl groups such as cyclohexyl group, aryl groups such as phenyl group, and aralkyl groups such as tolyl group. The organic residue is more preferably an alkyl group having 1 to 8 carbon atoms, alkenyl group or aryl group. The alkyl group is particularly preferably an alkyl group having 1 to 4 carbon atoms such as methyl group, ethyl group or propyl group. Further, the silicone compound used as the silicone-based flame retardant preferably contains an aryl group. A silane compound and a siloxane compound as organic surface treating agents for a titanium dioxide pigment are clearly distinguished from the silicone-based flame retardant as a preferred effect is obtained when they do not contain an aryl group. The silicone compound used as the silicone-based flame retardant may contain a reactive group in addition to the above Si—H group and alkoxy group. Examples of the reactive group include amino group, carboxyl group, epoxy group, vinyl group, mercapto group and methacryloxy group.

The content of the silicone-based flame retardant is preferably 0.01 to 20 parts by weight, more preferably 0.5 to 10 parts by weight, much more preferably 1 to 5 parts by weight based on 100 parts by weight of the resin component.

(III) Dye and Pigment

The resin composition of the present invention can provide molded articles having various designs when it further comprises various dyes or pigments. Examples of the dye or pigment used in the present invention include perylene-based dyes, coumalin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes and phthalocyanine-based dyes. When the resin composition of the present invention comprises a metallic pigment, a good metallic color can be obtained. The metallic pigment is preferably an aluminum powder. By blending a fluorescent brightener or a luminescent fluorescent dye other than the fluorescent brightener, a good design effect making use of a luminescent color can be provided.

(IV) Fluorescent Brightener

The resin composition of the present invention may comprise a fluorescent brightener. Any fluorescent brightener is used if it is used to change the color of a resin to white or blue-white color. Examples thereof include stilbene-based, benzimidazole-based, benzoxazole-based, naphthalimide-based, rhodamine-based, coumalin-based and oxazine-based compounds. More specifically, CI Fluorescent Brightener 219:1, the EASTOBRITE OB-1 of Eastman Chemical Company and the Hakkol PSR of Hakkol Chemical Co., Ltd. are such examples. The fluorescent brightener serves to absorb the energy of an ultraviolet part of light and apply this energy to a visible part. The content of the fluorescent brightener is preferably 0.001 to 0.1 part by weight, more preferably 0.001 to 0.05 part by weight based on 100 parts by weight of the resin component. Even when the content is higher than 0.1 part by weight, the effect of improving the color of the composition is small.

(V) Compound Having Heat Ray Absorbability

The resin composition of the present invention may comprise a compound having heat ray absorbability. Preferred examples of the compound include phthalocyanine-based near-infrared absorbents, metal compounds having excellent near infrared absorbability such as metal oxide-based near-infrared absorbents including ATO, ITO, iridium oxide, ruthenium oxide and immonium oxide and metal boride-based and tungsten-based near-infrared absorbents including lanthanum boride, cerium boride and tungsten boride, and carbon fillers. As the phthalocyanine-based near-infrared absorbent, MIR-362 is commercially available from Mitsui Chemicals, Inc. and can be easily acquired. The carbon fillers include carbon black, graphite (including natural and artificial products) and fullerene, out of which carbon black and graphite are preferred. They may be used alone or in combination of two or more.

The content of the phthalocyanine-based near-infrared absorbent is preferably 0.0005 to 0.2 part by weight, more preferably 0.0008 to 0.1 part by weight, much more preferably 0.001 to 0.07 part by weight based on 100 parts by weight of the resin component. The content of each of the metal oxide-based near-infrared absorbent, the metal boride-based near-infrared absorbent and the carbon filler in the resin composition of the present invention is preferably 0.1 to 200 ppm (based on weight), more preferably 0.5 to 100 ppm.

(VI) Light Diffusing Agent

A light diffusing effect can be provided when the resin composition of the present invention comprises a light diffusing agent. Examples of the light diffusing agent include polymer fine particles, inorganic fine particles having a low refractive index such as calcium carbonate and composites thereof. The polymer fine particles are fine particles which are already known as a light diffusing agent for polycarbonate resins. Preferred examples thereof include acrylic crosslinked particles and silicone crosslinked particles typified by polyorganosilsesquioxane having a particle diameter of several μm. The shape of the light diffusing agent is spherical, disk-like, columnar or infinite. The spherical shape does not need to be perfectly spherical and includes a deformed shape, and the columnar shape includes a cubic shape. The light diffusing agent is preferably spherical and more preferably uniform in particle size. The content of the light diffusing agent is preferably 0.005 to 20 parts by weight, more preferably 0.01 to 10 parts by weight, much more preferably 0.01 to 3 parts by weight based on 100 parts by weight of the resin component. Two or more light diffusing agents may be used in combination.

(VII) Light High Reflection White Pigment

A light reflection effect can be provided when the resin composition of the present invention comprises a light high reflection white pigment. As the white pigment, a titanium dioxide (especially titanium dioxide treated with an organic surface treating agent such as silicone) pigment is particularly preferred. The content of the light high reflection white pigment is preferably 3 to 30 parts by weight, more preferably 8 to 25 parts by weight based on 100 parts by weight of the resin component. Two or more light high reflection white pigments may be used in combination.

(VIII) Antistatic Agent

Since there is a case where antistatic performance is required for the resin composition of the present invention, the resin composition preferably comprises an antistatic agent in this case. Examples of the antistatic agent include (1) phosphonium salts of an organic sulfonic acid such as phosphonium salts of an arylsulfonic acid typified by phosphonium salts of dodecylbenzenesulfonic acid and phosphonium salts of an alkylsulfonic acid, and phosphonium salts of boric acid such as phosphonium salts of tetrafluoroboric acid. The content of the phosphonium salt is suitably not more than 5 parts by weight, preferably 0.05 to 5 parts by weight, more preferably 1 to 3.5 parts by weight, much more preferably 1.5 to 3 parts by weight based on 100 parts by weight of the resin component.

Other examples of the antistatic agent include (2) alkali (earth) metal salts of an organic sulfonic acid such as organic lithium sulfonates, organic sodium sulfonates, organic potassium sulfonates, organic cesium sulfonates, organic rubidium sulfonates, organic calcium sulfonates, organic magnesium sulfonates and organic barium sulfonates. The metal salts are also used as flame retardants as described above. Specific examples of the metal salts include metal salts of dodecylbenzenesulfonic acid and metal salts of perfluoroalkanesulfonic acid. The content of the alkali (earth) metal salt of an organic sulfonic acid is suitably not more than 0.5 part by weight, preferably 0.001 to 0.3 part by weight, more preferably 0.005 to 0.2 part by weight based on 100 parts by weight of the resin component. Alkali metal salts such as potassium, cesium and rubidium are particularly preferred.

Still other examples of the antistatic agent include (3) ammonium salts of an organic sulfonic acid such as ammonium salts of an alkylsulfonic acid and ammonium salts of an arylsulfonic acid. The content of the ammonium salt is suitably not more than 0.05 part by weight based on 100 parts by weight of the resin component. Further examples of the antistatic agent include (4) polymers containing a poly (oxyalkylene)glycol component such as polyether ester amide as a constituent component. The content of the polymer is suitably not more than 5 parts by weight based on 100 parts by weight of the resin component.

(IX) Filler

The resin composition of the present invention may comprise a known filler as a reinforcing filler. The filler is a fibrous filler, lamellar filler or granular filler. The fibrous filler has a fiber-like shape (including a rod-like, needle-like shape or a shape that its axis extends in multiple directions), and the lamellar filler has a lamellar shape (including what has an uneven surface or what has a curve). The granular filler is a filler having a shape other than the above shapes, including an infinite shape. The above fibrous and lamellar shapes are obvious from the observation of the shape of the filler in most cases. As for the difference between these shapes and the so-called infinite shape, it can be said that a filler having an aspect ratio of 3 or more is fibrous or lamellar.

Preferred examples of the lamellar filler include glass flakes, talc, mica, kaolin, metal flakes, carbon flakes, graphite and lamellar fillers obtained by coating these lamellar fillers with a different material such as a metal or metal oxide. The particle diameter of the lamellar filler is preferably in the range of 0.1 to 300 μm. The particle diameter is the median size (D50) of a particle size distribution measured by an X-ray transmission method which is one of liquid-phase sedimentation methods in an area up to 10 μm, the median size (D50) of a particle size distribution measured by a laser diffraction/scattering method in an area of 10 to 50 μm, and a value measured by a vibration sieving method in an area of 50 to 300 μm. The particle diameter is a particle diameter in the resin composition. The lamellar filler may be surface treated with a silane-based, titanate-based, aluminate-based or zirconate-based coupling agent, sized with a resin such as an olefin-based resin, styrene-based resin, acrylic resin, polyester-based resin, epoxy-based resin or urethane-based resin, or a higher fatty acid ester, or granulated by compression.

The fibrous filler has a fiber diameter of preferably 0.1 to 20 μm. The upper limit of the fiber diameter is preferably 13 μm, more preferably 10 μm. The lower limit of the fiber diameter is preferably 1 μm. The fiber diameter represents a number average fiber diameter. The number average fiber diameter is a value calculated from an image of the residue sampled after a molded article is dissolved in a solvent or the resin is decomposed with a basic compound, or an image of the ashing residue sampled after ashing in a crucible when observed through a scanning electron microscope.

Examples of the fibrous filler include inorganic fibrous fillers such as glass fibers, glass fibers having a flat cross section, glass milled fibers, carbon fibers, carbon milled fibers, metal fibers, asbestos, rock wool, ceramic fibers, slug fibers, potassium titanate whiskers, boron whiskers, aluminum borate whiskers, calcium carbonate whiskers, titanium oxide whiskers, wollastonite, zonotolite, parigolskite (Attapulgite) and sepiolite, fibrous heat-resistant organic fibers typified by heat-resistant organic fibers such as aramid fibers, polyimide fibers and polybenzothiazole fibers, and fibrous fillers obtained by coating these fillers with a different material such as a metal or metal oxide.

The fillers coated with a different material include metal coated glass fibers, metal coated glass flakes, titanium oxide coated glass flakes and metal coated carbon fibers. The method of coating the surface of the filler with a different material is not particularly limited, and known plating methods (such as electroplating, electroless plating and melt plating) and vacuum deposition, ion plating, CVD (such as thermal CVD, MOCVD and plasma CVD), PVD and sputtering methods may be employed.

The fibrous filler has an aspect ratio of 3 or more, preferably 5 or more, more preferably 10 or more. The upper limit of the aspect ratio is about 10,000, preferably 200. The aspect ratio of the filler is a value in the resin composition. The glass fibers having a flat cross section are glass fibers having an average long diameter value on the fiber cross section of 10 to 50 μm, preferably 15 to 40 μm, more preferably 20 to 35 μm and an average ratio of the long diameter to the short diameter (long diameter/short diameter) of 1.5 to 8, preferably 2 to 6, more preferably 2.5 to 5. The fibrous filler may be surface treated with a coupling agent, sized with a resin, or granulated by compression like the above lamellar filler. The content of the filler is preferably not more than 200 parts by weight, more preferably not more than 100 parts by weight, much more preferably not more than 50 parts by weight, particularly preferably not more than 30 parts by weight based on 100 parts by weight of the resin component.

(X) Another Resin and Elastomer

The resin composition of the present invention may comprise small amounts of another resin except for the component C and an elastomer in place of part of the polycarbonate resin as the component A as long as the effect of the present invention is obtained. The total amount of the other resin and the elastomer is preferably not more than 20 wt %, more preferably not more than 10 wt %, much more preferably not more than 5 wt % based on 100 wt % of the total of the component A, the other resin and the elastomer.

Examples of the other resin include polyester resins such as polyethylene terephthalate and polybutylene terephthalate, polyamide resins, polyimide resins, polyether-imide resins, polyurethane resins, silicone resins, polyphenylene ether resins, polyphenylene sulfide resins, polysulfone resins, polymethacrylate resins, phenol resins and epoxy resins. Examples of the elastomer include isobutylene/isoprene rubber, styrene/butadiene rubber, ethylene/propylene rubber, acrylic elastomers, polyester-based elastomers, polyamide-based elastomers, MBS (methyl methacrylate/styrene/butadiene) rubber which is a core-shell type elastomer, MB(m-ethyl methacrylate/butadiene) rubber and MAS (methyl methacrylate/acrylonitrile/styrene) rubber.

(XI) Others

The resin composition of the present invention may comprise a flowability modifier, antibacterial agent, dispersant such as liquid paraffin, photocatalyst-based antifouling agent and photochromic agent. Although the resin composition of the present invention has excellent impact resistance and coating resistance without adding an impact modifier, when other additives are added, an impact modifier may be added as required.

<Characteristic Properties of Resin Composition>

In the resin composition of the present invention, the amount of a low-molecular weight siloxane measured under heating at 150° C. for 30 minutes in accordance with a cryotrapping GC-MS method is preferably not more than 1 μg/mg based on the weight of the resin composition.

<Production of Resin Composition>

Any process is employed to produce the resin composition of the present invention. For example, after the component A, the component B, the component C and optionally other components are fully mixed together by using pre-mixing means such as a twin-cylinder mixer, Henschel mixer, mechanochemical device or extrusion mixer, the resulting mixture is granulated by means of an extrusion granulator or briquetting machine as required and melt kneaded by means of an extruder such as a single-screw extruder or double-screw extruder to be pelletized.

To produce such a pellet, the above flame retardant, reinforcing filler and additives may be blended. Various products can be manufactured by injection molding the pellet which has been produced from the resin composition of the present invention as described above. The resin which has been melt kneaded by means of an extruder may be directly formed into a sheet, film, profile extrusion molded article, direct blow molded article or injection molded article without being pelletized. The resin composition of the present invention may be formed into a profile extrusion molded article, sheet or film by extrusion molding. Inflation, calendering and casting techniques may also be used to mold a sheet or film.

Further, specific stretching operation may be used to mold a heat shrinkable tube. The resin composition of the present invention can be formed into a molded article by rotational molding or blow molding as well.

<Production of Molded Article>

A molded article can be generally obtained by injection molding the pellet of the resin composition of the present invention. A molded article can also be manufactured by not only an ordinary cold runner injection molding technique but also a hot runner injection molding technique which enables the elimination of a runner. For injection molding, not only ordinary molding techniques but also molding techniques such as gas assist injection molding, injection compression molding, super high-speed injection molding, injection press molding, two-color molding, sandwich molding, in-mold coating molding, insert molding, foam molding (including what makes use of a super-critical fluid), quick heating and cooling molding, insulated runner molding, in-mold re-melting molding and a combination thereof may be employed.

Further, a molded article formed from the resin composition may be subjected to various surface treatments. The surface treatments include decorative coating, hard coating, water-repellent and oil-repellent coating, hydrophilic coating, ultraviolet light absorption coating, infrared light absorption coating, electromagnetic wave absorption coating, exothermic coating, antistatic coating, static control coating, conductive coating and metallizing (such as plating, chemical vapor deposition (CVD), physical vapor deposition (PVD) or thermal spray). A laminate comprising a transparent sheet and a transparent conductive layer covering the sheet is particularly preferred.

The present invention includes a molded article of the above resin composition. The present invention also includes a coated molded article. The molded article is suitable for use as an exterior member for mobile information terminals.

The mode of the invention that the inventors of the present invention think is the best is a combination of the preferred ranges of the above requirements. For example, typical examples thereof are described in the following examples. It is to be understood that the present invention is not limited thereto.

EXAMPLES

Examples 1 to 13 and Comparative Examples 1 to 4

1. Evaluation of Polycarbonate and Polycarbonate-polyorganosiloxane Copolymer
(1) Viscosity Average Molecular Weight (Mv)

The specific viscosity ($\eta_{sp}$) calculated from the following equation was obtained from a solution prepared by dissolving the polycarbonate resin or the polycarbonate-polydiorganosiloxane copolymer resin in 100 ml of methylene chloride at 20° C. by using an Ostwald viscometer. Specific viscosity ($\eta_{sp}$) $(t-t_0)/t_0$ [$t_0$ is the number of seconds during which methylene chloride drops and t is the number of seconds during which a sample solution drops.]

The viscosity average molecular weight Mv was calculated from the obtained specific viscosity ($\eta_{sp}$) based on the following equation.

$\eta_{sp}/c=[\eta]+0.45\times[\eta]^2 c$ ([$\eta$] represents an intrinsic viscosity)

$[\eta]=1.23\times10^{-4}M^{0.83}$ $c=0.7$ (2) Content of Polydiorganosiloxane Component The $^1$H-NMR spectrum of the polycarbonate-polydiorganosiloxane copolymer resin was measured by using the JNM-AL400 of JEOL Ltd. to compare the integral ratio of a peak derived from the dihydric phenol (I) with the integral ratio of a peak derived from the dihydroxyaryl-terminated polydiorganosiloxane (II).

Content of polydiorganosiloxane component(wt %)= [$A/(A+B)$]×100

A: [integral ratio of peak of one $^1$H of dihydroxyaryl-terminated polydiorganosiloxane (II)]×[molecular weight of polydiorganosiloxane moiety]
B: [integral ratio of peak of one $^1$H of dihydric phenol (I)]×[molecular weight of dihydric phenol]
(3) Average Size of Polydiorganosiloxane Domains The polycarbonate-polydiorganosiloxane copolymer powder was kneaded by means of a vented double-screw extruder (KZW15-25MG of Technovel Corporation) at 260° C. to be pelleted. The obtained pellet was dried at 120° C. for 5 hours with a hot air drier and molded at a molding temperature of 280° C. and a mold temperature of 80° C. by means of an injection molding machine [SG150U•S-M IV of Sumitomo Heavy Industries, Ltd.] to obtain a triple plate having a width of 50 mm, a length of 90 mm and a thickness from the gate side of 3.0 mm (length of 20 mm), 2.0 mm (length of 45 mm) and 1.0 mm (length of 25 mm). This triple plate was used to measure the average size of polydiorganosiloxane domains at an intersection point 5 mm from the end part and 5 mm from the side part of a 1.0 mm-thick portion by means of an X-ray diffraction apparatus (RINT-TTRII of Rigaku Corporation). An X-ray source producing a CuKα characteristic X-ray (wavelength of 0.1541841 nm) and having a tube voltage of 50 kV and a tube current of 300 mA was used. The small angle scattering optical system has a first slit of 0.03 mm with HS of 10 mm, SS of 0.2 mm and RS of 0.1 mm. Measurement was made under the conditions of FT 0.01° step, 4 sec/step and a scanning range of 0.06-3° by an asymmetric scanning method (2θ scan). The NANO-Solver (Ver. 3.3) small angle scattering analytical software of Rigaku Corporation was used for the analysis of curve fitting. Analysis was made on an isolated particle model having a polycarbonate matrix density of 1.2 g/cm$^3$ and a polydiorganosiloxane domain density of 1.1 g/cm$^3$ in which interaction between particles (interference between particles) was not taken into consideration based on the assumption that it had an aggregation structure that polydiorganosiloxane spherical domains were dispersed in the polycarbonate polymer matrix and there were variations in particle size distribution.

2. Evaluation of Polycarbonate Resin Composition
(1) Charpy Impact Strength, Low-temperature Impact Property They were measured in accordance with ISO179 (measurement conditions of 23° C. and −30° C.). Test pieces were molded by drying the obtained pellets at 120° C. for 5 hours and then molding at a cylinder temperature of 280° C. and a mold temperature of 80° C. by means of an injection molding machine (SG-150U of Sumitomo Heavy Industries, Ltd.).

(2) Coating Properties
(i) Appearance

A mobile information terminal model (having a rib on the rear surface) having a length of 150 mm, a width of 100 mm and a thickness of 0.8 mm was formed at a cylinder temperature of 300° C. and a mold temperature of 90° C. by using the SG-150U molding machine of Sumitomo Heavy Industries, Ltd. The obtained molded product was spray coated (using the spray for mini hobbies of Nippe Home Products Co., Ltd.) to evaluate the appearance thereof before and after coating based on the following criteria.
Appearance before Coating
◯: no surface unevenness and deformation of molded product
Δ: slight surface unevenness of molded product
x: existence of surface unevenness and deformation of molded product
Appearance after Coating
◯: no coat repellency, peeling and unevenness
Δ: slight coat peeling
x: existence of coat repellency, peeling and unevenness
(ii) Impact Property The obtained molded product was spray coated in the same manner as in (i) appearance to evaluate impact resistance before and after coating by using the Hydroshot HTM-1 of Shimadzu Corporation in a high-speed surface impact test (striker diameter of 12.8 mm, puncture speed of 7 m/s). Retention R which is an impact property defined by the following equation was used for evaluation.

$$R\ (\%) = [G1/G2] \times 100$$

(G1: high-speed surface impact value after coating (puncture value), G2: high-speed surface impact value before coating (puncture value))

3. Production of Polycarbonate Resin Composition

Amounts shown in Table 1 of the components A to C and additives were mixed together by means of a blender and melt kneaded together by means of a vented double-screw extruder to obtain a pellet. After a premixture of the polycarbonate resin and the additives whose amounts were 10 to 100 times larger than the above amounts was prepared, the whole premixture was mixed by means of the blender. The TEX30α vented double-screw extruder of The Nippon Steel Works, Ltd. (completely interlocking type, unidirectional rotation, two screws) was used. The extrusion conditions include a delivery rate of 20 kg/h, a screw revolution of 150 rpm, a vent vacuum degree of 3 kPa, an extrusion temperature from the first feed port to the second feed port of 290° C. and an extrusion temperature from the second feed port to the die of 295° C. The above evaluations were made on the obtained pellet. The results are shown in Table 1.

TABLE 1

|  |  |  |  | Examples |  |  |  |  |  |  |  |  |  |
|---|---|---|---|---|---|---|---|---|---|---|---|---|---|
|  |  |  |  | 1 | 2 | 3 | 4 | 5 | 6 | 7 | 8 | 9 | 10 |
| Component A | PC-1 | parts by weight | | 50 | 50 | 50 | 40 |  | 10 | 75 | 25 | 50 | 50 |
|  | PC-2 |  | |  |  |  | 10 |  |  |  |  |  |  |
|  | PC-3 |  | |  |  |  |  | 50 |  |  |  |  |  |
| Component B | B-1 |  | | 50 | 50 | 50 | 50 |  |  | 25 | 75 | 50 |  |
|  | B-2 |  | |  |  |  |  | 50 |  |  |  |  |  |
|  | B-3 |  | |  |  |  |  |  | 90 |  |  |  |  |
|  | B-4 |  | |  |  |  |  |  |  |  |  |  | 50 |
| Total of resin components |  |  | | 100 | 100 | 100 | 100 | 100 | 100 | 100 | 100 | 100 | 100 |
| Amount of siloxane |  |  | | 4.0 | 4.0 | 4.0 | 4.0 | 4.0 | 3.6 | 2.0 | 6.0 | 4.0 | 4.0 |
| Component C | C-1 | parts by weight | | 1.0 | 0.7 | 2.2 | 1.0 | 1.0 | 1.0 | 1.0 | 1.0 |  | 1.0 |
|  | C-2 |  | |  |  |  |  |  |  |  |  | 1.0 |  |
| Others | A | weight | | 0.1 | 0.1 | 0.1 | 0.1 | 0.1 | 0.1 | 0.1 | 0.1 | 0.1 | 0.1 |
|  | CB |  | |  |  |  |  |  |  |  |  |  |  |
|  | TiO$_2$ |  | |  |  |  |  |  |  |  |  |  |  |
| Charpy impact strength | 23° C. | kJ/m$^2$ | | 67 | 69 | 63 | 66 | 69 | 60 | 72 | 58 | 66 | 69 |
|  | −30° C. |  | | 56 | 53 | 50 | 52 | 54 | 57 | 52 | 55 | 49 | 56 |
| Coating properties | Appearance | Before coating | | ○ | ○ | ○ | ○ | ○ | ○ | ○ | ○ | ○ | △ |
|  |  | After coating | | ○ | ○ | ○ | ○ | ○ | ○ | ○ | ○ | ○ | ○ |
|  | High-speed surface impact | Retention | % | 92 | 88 | 90 | 90 | 91 | 93 | 89 | 92 | 90 | 92 |

|  |  |  |  | Examples |  |  | Comparative Example |  |  |  |
|---|---|---|---|---|---|---|---|---|---|---|
|  |  |  |  | 11 | 12 | 13 | 1 | 2 | 3 | 4 |
| Component A | PC-1 | parts by weight | | 50 | 50 | 50 | 100 | 50 | 50 | 50 |
|  | PC-2 |  | |  |  |  |  |  |  |  |
|  | PC-3 |  | |  |  |  |  |  |  |  |
| Component B | B-1 |  | | 50 | 50 | 50 |  | 50 | 50 | 50 |
|  | B-2 |  | |  |  |  |  |  |  |  |
|  | B-3 |  | |  |  |  |  |  |  |  |
|  | B-4 |  | |  |  |  |  |  |  |  |
| Total of resin components |  |  | | 100 | 100 | 100 | 100 | 100 | 100 | 100 |
| Amount of siloxane |  |  | | 4.0 | 4.0 | 4.0 | 0.0 | 4.0 | 4.0 | 4.0 |
| Component C | C-1 | parts by weight | | 1.0 | 1.0 | 1.0 | 1.0 | 0.0 | 0.20 | 3.0 |
|  | C-2 |  | |  |  |  |  |  |  |  |
| Others | A | weight | | 0.1 | 0.1 |  | 0.1 | 0.1 | 0.1 | 0.1 |
|  | CB |  | |  | 0.5 |  |  |  |  |  |
|  | TiO$_2$ |  | |  |  | 1 |  |  |  |  |
| Charpy impact strength | 23° C. | kJ/m$^2$ | | 67 | 65 | 67 | 70 | 67 | 69 | 51 |
|  | −30° C. |  | | 56 | 52 | 56 | 32 | 36 | 39 | 38 |

TABLE 1-continued

| Coating properties | Appearance | Before coating | | ○ | ○ | ○ | ○ | ○ | ○ | Δ |
|---|---|---|---|---|---|---|---|---|---|---|
| | | After coating | | ○ | ○ | ○ | ○ | ○ | ○ | x |
| | High-speed surface impact | Retention | % | 92 | 91 | 92 | 71 | 76 | 79 | 90 |

The components in use are detailed hereinbelow.

(Component A)

PC-1: polycarbonate resin powder having a viscosity average molecular weight of 19,800 obtained by the following production method

[Production Method]

2,340 parts of ion exchange water, 947 parts of a 25% sodium hydroxide aqueous solution and 0.7 part of hydrosulfite were fed to a reactor equipped with a thermometer, a stirrer and a reflux condenser, 710 parts of 2,2-bis(4-hydroxyphenyl) propane (may be referred to as "bisphenol A" hereinafter) was dissolved under agitation (bisphenol A solution), 2,299 parts of methylene chloride and 112 parts of a 48.5% sodium hydroxide aqueous solution were added to the resulting solution, and 354 parts of phosgene was blown into the reactor at 15 to 25° C. for about 90 minutes to carry out a phosgene reaction. After the end of the phosgene reaction, 148 parts of a 11% methylene chloride solution of p-tert-butylphenol and 88 parts of a 48.5% sodium hydroxide aqueous solution were added, stirring was suspended, the resulting solution was left to stand for 10 minutes and separated, stirring was resumed to emulsify the solution, and five minutes after that, the obtained emulsion was treated 35 times of pass at a revolution of 1,200 rpm by means of a homomixer (manufactured by PRIMIX Corporation) to obtain highly emulsified dope. This highly emulsified dope was reacted in a polymerization tank (having a stirrer) at a temperature of 35° C. for 3 hours under no agitation to complete polymerization. After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate powder. After dehydration, the powder was dried at 120° C. for 12 hours with a hot air circulation drier to obtain a polycarbonate resin powder.

PC-2: polycarbonate resin powder having a viscosity average molecular weight of 16,500 obtained by the following production method

[Production Method]

This polycarbonate resin powder was obtained in the same manner as PC-1 except that the amount of the 11% methylene chloride solution of p-tert-butylphenol was changed to 193 parts.

PC-3: polycarbonate resin powder having a viscosity average molecular weight of 23,200 obtained by the following production method

[Production Method]

This polycarbonate powder was obtained in the same manner as PC-1 except that the amount of the 11% methylene chloride solution of p-tert-butylphenol was changed to 118 parts.

(Component B)

B-1: polycarbonate-polydiorganosiloxane copolymer powder having a viscosity average molecular weight of 19,400 obtained by the following production method

[Production Method]

21,591 parts of ion exchange water and 3,674 parts of a 48.5% sodium hydroxide aqueous solution were fed to a reactor equipped with a thermometer, a stirrer and a reflux condenser, 3,880 parts of 2,2-bis(4-hydroxyphenyl)propane (bisphenol A) and 7.6 parts of hydrosulfite were dissolved, 14,565 parts (14 moles based on 1 mole of the dihydroxy compound (I)) of methylene chloride was added, and 1,900 parts of phosgene was blown into the reactor at 22 to 30° C. for about 60 minutes under agitation. Thereafter, 1,131 parts of a 48.5% sodium hydroxide aqueous solution and a solution prepared by dissolving 105 parts of p-tert-butylphenol in 800 parts of methylene chloride were added, and a solution prepared by dissolving 430 parts of a polydiorganosiloxane compound represented by the following formula [8] (average number of repetitions in the above formula of about 37) in 1,600 parts of methylene chloride was added under agitation at a rate which ensured that the amount of the dihydroxyaryl-terminated polydiorganosiloxane (II) became 0.0008 mole/min based on 1 mole of the dihydric phenol (I) to be emulsified and violently stirred again. Under agitation, 4.3 parts of triethylamine was added while the temperature of the reaction solution was 26° C., and stirring was continued for 45 minutes at a temperature of 26 to 31° C. to terminate the reaction. After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate-polydiorganosiloxane copolymer resin powder. After dehydration, the powder was dried at 120° C. for 12 hours with a hot air circulation drier to obtain a polycarbonate-polydiorganosiloxane copolymer resin powder. (content of polydiorganosiloxane component of 8.2%, average domain size of polydiorganosiloxane domains of 9 nm, viscosity average molecular weight of 19,400).

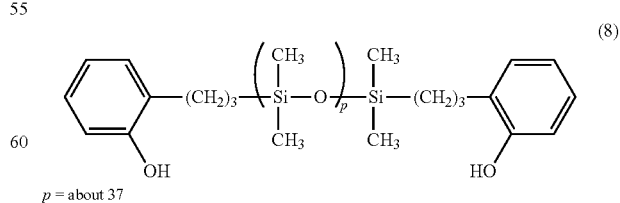

(8)

$p$ = about 37

B-2: polycarbonate-polydiorganosiloxane copolymer resin powder having a viscosity average molecular weight of 15,000 obtained by the following production method

[Production Method]

This polycarbonate-polydiorganosiloxane copolymer resin powder was obtained in the same manner as B-1 except that the amount of p-tert-butylphenol was changed to 132 parts. (content of polydiorganosiloxane component of 8.2%, average size of polydiorganosiloxane domains of 9 nm, viscosity average molecular weight of 15,000)

B-3: polycarbonate-polydiorganosiloxane copolymer resin powder having a viscosity average molecular weight of 19,300 obtained by the following production method

[Production Method]

This polycarbonate-polydiorganosiloxane copolymer resin powder was obtained in the same manner as B-1 except that 204 parts of the polydiorganosiloxane compound represented by the above formula [8] was used and the stirring time was changed to 60 minutes. (content of polydiorganosiloxane component of 4.1%, average size of polydiorganosiloxane domains of 8 nm, viscosity average molecular weight of 19,300)

B-4: polycarbonate-polydiorganosiloxane copolymer resin powder having a viscosity average molecular weight of 19,200 obtained by the following production method

[Production Method]

This polycarbonate-polydiorganosiloxane copolymer resin powder was obtained in the same manner as B-1 except that 204 parts of a polydiorganosiloxane compound having an average number "p" of repetitions in the above formula (8) of about 200 was used. (content of polydiorganosiloxane component of 4.2%, average size of polydiorganosiloxane domains of 25 nm, viscosity average molecular weight of 19,200)

(Component C)

C-1: polyethylene resin having a density of 0.95 g/cm$^3$, an acid value of 1 mg/KOH and a weight average molecular weight of 60,000 (Hizex (trademark) 2100JP of Mitsui Chemicals, Inc.)

C-2: polyethylene resin having a density of 0.92 g/cm$^3$, an acid value of 1 mg/KOH and a weight average molecular weight of 120,000 (Novatec (trademark) LD LF1291 of Japan Polyethylene Corporation)

(Other Components)

A: tris(2,4-di-t-butylphenyl)phosphite) (manufactured by CIBA SPECIALTY CHEMICALS INC.)

CB: carbon black (RB-961S of ECCA CO., LTD.)

$TiO_2$: titanium dioxide (White DCF-T-17007 of Resino Color Industry Co., Ltd.)

Examples 14 to 32

1. Evaluation of Polycarbonate and Polycarbonate-polydiorganosiloxane Copolymer Resin (1) Viscosity Average Molecular Weight (Mv)

The specific viscosity ($\eta_{sp}$) calculated from the following equation was obtained from a solution prepared by dissolving 0.7 g of the polycarbonate resin or the polycarbonate-polydiorganosiloxane copolymer resin in 100 ml of methylene chloride at 20° C. by using an Ostwald viscometer. Specific viscosity ($\eta_{sp}$)=(t-t$_0$)/t$_0$ [t$_0$ is the number of seconds during which methylene chloride drops and t is the number of seconds during which a sample solution drops.]

The viscosity average molecular weight Mv was calculated from the obtained specific viscosity ($\eta_{sp}$) based on the following equation.

$\eta_{sp}/c=[\eta]+0.45\times[\eta]^2 c$ ([$\eta$] Represents an Intrinsic viscosity)

$[\eta]=1.23\times10^{-4}M^{0.83}$ $c=0.7$ (2) Content of Polydiorganosiloxane Component The $^1$H-NMR spectrum of the polycarbonate-polydiorganosiloxane copolymer resin was measured by using the JNM-AL400 of JEOL Ltd. to compare the integral ratio of a peak derived from the dihydric phenol (I) with the integral ratio of a peak derived from the dihydroxyaryl-terminated polydiorganosiloxane (II).

Content of polydiorganosiloxane component (wt %)= $[A/(A+B)]\times100$

A: [integral ratio of peak of one $^1$H of dihydroxyaryl-terminated polydiorganosiloxane (II)]×[molecular weight of polydiorganosiloxane moiety]

B: [integral ratio of peak of one $^1$H of dihydric phenol (I)]×[molecular weight of dihydric phenol]

(3) Average Size of Polydiorganosiloxane Domains

The polycarbonate-polydiorganosiloxane copolymer resin powder was kneaded by means of a vented double-screw extruder (KZW15-25MG of Technovel Corporation) at 260° C. to be pelleted. The obtained pellet was dried at 120° C. for 5 hours with a hot air drier and molded at a molding temperature of 280° C. and a mold temperature of 80° C. by means of an injection molding machine [SG150U•S-M IV of Sumitomo Heavy Industries, Ltd.] to obtain a triple plate having a width of 50 mm, a length of 90 mm and a thickness from the gate side of 3.0 mm (length of 20 mm), 2.0 mm (length of 45 mm) and 1.0 mm (length of 25 mm). This triple plate was used to measure the average size of polydiorganosiloxane domains at an intersection point 5 mm from the end part and 5 mm from the side part of a 1.0 mm thick portion by means of an X-ray diffraction apparatus (RINT-TTRII of Rigaku Corporation). An X-ray source producing a CuKα characteristic X-ray (wavelength of 0.1541841 nm) and having a tube voltage of 50 kV and a tube current of 300 mA was used. The small angle scattering optical system has a first slit of 0.03 mm with HS of 10 mm, SS of 0.2 mm and RS of 0.1 mm. Measurement was made under the conditions of FT 0.01° step, 4 sec/step and a scanning range of 0.06-3° by an asymmetric scanning method (2θ scan). The NANO-Solver (Ver. 3.3) small angle scattering analytical software of Rigaku Corporation was used for the analysis of curve fitting. Analysis was made on an isolated particle model having a polycarbonate matrix density of 1.2 g/cm$^3$ and a polydiorganosiloxane domain density of 1.1 g/cm$^3$ in which interaction between particles (interference between particles) was not taken into consideration based on the assumption that it had an aggregation structure that polydiorganosiloxane spherical domains were dispersed in the polycarbonate polymer matrix and there were variations in particle size distribution.

2. Evaluation of Polycarbonate Resin Composition (1) Charpy Impact Strength, Low-temperature Impact Resistance They were measured in accordance with ISO179 (measurement conditions of 23° C. and -30° C. Test pieces were formed by drying pellets obtained from the compositions of Examples at 120° C. for 5 hours with a hot air circulation drier and then molding at a cylinder temperature of 280° C. and a mold temperature of 80° C. by means of an injection molding machine (IS150EN-5Y of Toshiba Machine Co., Ltd.).

(2) Flame Retardancy

Test pieces having thicknesses of 1.2 mm, 1.5 mm and 1.8 mm for the evaluation of UL94 flame retardancy were molded and evaluated. The test pieces were formed by drying pellets obtained from the compositions of Examples at 120° C. for 5 hours with a hot air circulation drier and then molding at a cylinder temperature of 280° C. and a mold temperature of 80° C. by means of an injection molding machine [IS150EN-5Y of Toshiba Machine Co., Ltd.]. When they could not meet V-0, V-1 and V-2 standards, they were designated as "notV".

(3) Tracking Resistance

The proof tracking index (PTI) was obtained in accordance with IEC 60112. As test pieces, square plates having a length of 75 mm, a width of 75 mm and a thickness of 3.0 mm were formed by drying pellets obtained from the compositions of Examples at 120° C. for 5 hours with a hot air circulation drier and then molding at a cylinder temperature of 280° C. and a mold temperature of 80° C. by means of an injection molding machine [IS150EN-5Y of Toshima Machine Co., Ltd.]. As the application voltage at the time of testing becomes higher, the PTI value becomes larger.

(4) Amount of Generated Gas 10 mg of a pellet obtained from each of the compositions of Examples was weighed and injected into a heating furnace (Pyrolyzer PY-2020iD of Frontier Laboratories Ltd.) to be kept at 150° C. for 30 minutes so as to carry out the GC/MS analysis of the generated gas by using cryotrapping GC-MS.

GC/MS: GC6890+MSD5973 (Agilent)
Column: SPB-1Sulfur (30 m×0.32 mm ID, film thickness of 4.0 μm)
Oven temperature: 40 to 300° C. (10° C./min)
Scan range: m/z 29~600

Then, a calibration curve was drawn by using octamethyl cyclotetrasiloxane (manufactured by Wako Pure Chemical Industries, Ltd.) as a reference material to determine the amount of the generated gas. The criteria are given below.

○: amount of generated low-molecular weight siloxane ≤1 μg/mg
x: amount of generated low-molecular weight siloxane >1 μg/mg The low-molecular weight siloxane as used in the present invention is a cyclic low-molecular weight siloxane compound represented by the following general formula [9].

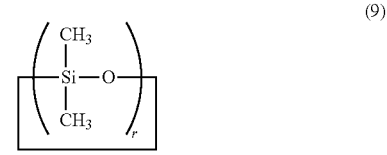

(9)

[In the above formula, "r" is a natural number of 3 to 6.]

3. Production of Polycarbonate Resin Composition

Amounts shown in Table 2 of the components A to D and additives were mixed together by means of a blender and melt kneaded together by means of a vented double-screw extruder to obtain a pellet. After a premixture of the polycarbonate resin and the additives whose amounts were 10 to 100 times larger than the above amounts was prepared, the whole premixture was mixed by means of the blender. The TEX30α vented double-screw extruder of The Nippon Steel Works, Ltd. (completely interlocking type, unidirectional rotation, two screws) was used. The extrusion conditions include a delivery rate of 20 kg/h, a screw revolution of 150 rpm, a vent vacuum degree of 3 kPa, an extrusion temperature from the first feed port to the second feed port of 270° C. and an extrusion temperature from the second feed port to the die of 280° C.

TABLE 2

|  |  |  | Examples | | | | | | | |
|---|---|---|---|---|---|---|---|---|---|---|
|  |  |  | 14 | 15 | 16 | 17 | 18 | 19 | 20 | 21 |
| Component A | PC-1 | Parts by weight | 50 | 50 | 50 | 50 | 50 | 50 | 50 |  |
|  | PC-2 |  |  |  |  |  |  |  |  |  |
|  | PC-3 |  |  |  |  |  |  |  |  | 40 |
| Component B | B-1 |  | 50 | 50 | 50 | 50 | 50 | 50 | 50 |  |
|  | B-2 |  |  |  |  |  |  |  |  | 60 |
|  | b-3 |  |  |  |  |  |  |  |  |  |
|  | b-4 |  |  |  |  |  |  |  |  |  |
|  | B-5 |  |  |  |  |  |  |  |  |  |
| Total of resin components |  |  | 100 | 100 | 100 | 100 | 100 | 100 | 100 | 100 |
| Amount of siloxane |  |  | 4.0 | 4.0 | 4.0 | 4.0 | 4.0 | 4.0 | 4.0 | 4.8 |
| Component D | D-1 | Parts by weight | 0.05 | 0.80 | 0.01 | 0.05 |  |  | 0.05 | 0.05 |
|  | D-2 |  |  |  |  |  | 0.10 |  |  |  |
|  | D-3 |  |  |  |  |  |  | 0.40 |  |  |
| Component C | C-1 |  | 1.00 | 2.00 | 1.00 | 0.60 | 1.00 | 1.00 |  | 1.00 |
|  | c-2 |  |  |  |  |  |  |  | 1.00 |  |
| Component E | E-1 |  |  |  |  |  |  |  |  |  |
|  | E-2 |  |  |  |  |  |  |  |  |  |
| Component F | F-1 |  |  |  |  |  |  |  |  |  |
|  | F-2 |  |  |  |  |  |  |  |  |  |
| Others | a |  | 0.10 | 0.10 | 0.10 | 0.10 | 0.10 | 0.10 | 0.10 | 0.10 |
|  | CB |  |  |  |  |  |  |  |  |  |
|  | TiO$_2$ |  |  |  |  |  |  |  |  |  |
| Charpy impact strength | 23° C. | kJ/m$^2$ | 65 | 57 | 65 | 64 | 63 | 68 | 66 | 67 |
|  | −30° C. |  | 54 | 56 | 55 | 50 | 53 | 54 | 52 | 54 |
| Flame retardancy | 1.2 mm |  | V-2 | V-2 | V-2 | V-2 | V-2 | V-2 | V-2 | V-2 |
|  | 1.5 mm |  | V-2 | V-2 | V-2 | V-2 | V-2 | V-2 | V-2 | V-2 |
|  | 1.8 mm |  | V-2 | V-2 | V-2 | V-2 | V-2 | V-2 | V-2 | V-2 |
| Tracking resistance | PTI | V | 250 | 275 | 250 | 250 | 250 | 250 | 250 | 250 |
| Amount of generated gas |  |  | ○ | ○ | ○ | ○ | ○ | ○ | ○ | ○ |

TABLE 2-continued

|  |  |  | Examples | | | | | | |
| --- | --- | --- | --- | --- | --- | --- | --- | --- | --- |
|  |  |  | 22 | 23 | 24 | 25 | 26 | 27 | 28 |
| Component A | PC-1 | Parts | 50 |  | 70 |  | 50 | 50 | 50 |
|  | PC-2 | by |  | 20 |  | 30 |  |  |  |
|  | PC-3 | weight |  |  |  |  |  |  |  |
| Component B | B-1 |  |  | 80 |  |  | 50 | 50 | 50 |
|  | B-2 |  |  |  |  |  |  |  |  |
|  | b-3 |  | 50 |  |  |  |  |  |  |
|  | b-4 |  |  |  | 30 | 70 |  |  |  |
|  | B-5 |  |  |  |  |  |  |  |  |
| Total of resin components |  |  | 100 | 100 | 100 | 100 | 100 | 100 | 100 |
| Amount of siloxane |  |  | 4.0 | 6.4 | 3.6 | 8.4 | 4.0 | 4.0 | 4.0 |
| Component D | D-1 | Parts | 0.05 | 0.05 | 0.05 | 0.05 | 0.05 | 0.05 | 0.05 |
|  | D-2 | by |  |  |  |  |  |  |  |
|  | D-3 | weight |  |  |  |  |  |  |  |
| Component C | C-1 |  | 1.00 | 1.00 | 1.00 | 1.00 | 1.00 | 1.00 | 1.00 |
|  | c-2 |  |  |  |  |  |  |  |  |
| Component E | E-1 |  |  |  |  |  |  | 0.80 | 0.80 |
|  | E-2 |  |  |  |  |  |  |  |  |
| Component F | F-1 |  |  |  |  |  |  |  | 0.30 |
|  | F-2 |  |  |  |  |  |  |  |  |
| Others | a |  | 0.10 | 0.10 | 0.10 | 0.10 |  | 0.10 | 0.10 |
|  | CB |  |  |  |  |  |  |  |  |
|  | $TiO_2$ |  |  |  |  |  |  |  |  |
| Charpy impact strength | 23° C. | $kJ/m^2$ | 63 | 62 | 65 | 56 | 64 | 52 | 53 |
|  | −30° C. |  | 56 | 54 | 51 | 58 | 54 | 44 | 43 |
| Flame retardancy | 1.2 mm |  | V-2 | V-2 | V-2 | V-2 | V-2 | V-0 | V-0 |
|  | 1.5 mm |  | V-2 | V-2 | V-2 | V-2 | V-2 | V-0 | V-0 |
|  | 1.8 mm |  | V-2 | V-2 | V-2 | V-2 | V-2 | V-0 | V-0 |
| Tracking resistance | PTI | V | 250 | 250 | 250 | 250 | 250 | 250 | 250 |
| Amount of generated gas |  |  | ○ | ○ | ○ | ○ | ○ | ○ | ○ |

|  |  |  | Examples | | | |
| --- | --- | --- | --- | --- | --- | --- |
|  |  |  | 29 | 30 | 31 | 32 |
| Component A | PC-1 | Parts | 5 | 5 | 10 | 10 |
|  | PC-2 | by |  |  |  |  |
|  | PC-3 | weight |  |  |  |  |
| Component B | B-1 |  | 95 | 95 | 90 | 90 |
|  | B-2 |  |  |  |  |  |
|  | b-3 |  |  |  |  |  |
|  | b-4 |  |  |  |  |  |
|  | B-5 |  |  |  |  |  |
| Total of resin components |  |  | 100 | 100 | 100 | 100 |
| Amount of siloxane |  |  | 7.6 | 7.6 | 7.20 | 7.20 |
| Component D | D-1 | Parts | 0.05 | 0.05 | 0.05 | 0.05 |
|  | D-2 | by |  |  |  |  |
|  | D-3 | weight |  |  |  |  |
| Component C | C-1 |  | 1.00 |  | 1.00 | 1.00 |
|  | c-2 |  |  | 1.00 |  |  |
| Component E | E-1 |  |  |  |  |  |
|  | E-2 |  | 0.18 | 0.18 | 0.18 | 0.18 |
| Component F | F-1 |  |  |  |  |  |
|  | F-2 |  | 0.30 | 0.30 | 0.30 | 0.30 |
| Others | a |  | 0.10 | 0.10 | 0.10 | 0.10 |
|  | CB |  |  |  | 0.50 |  |
|  | $TiO_2$ |  |  |  |  | 1 |
| Charpy impact strength | 23° C. | $kJ/m^2$ | 57 | 58 | 58 | 55 |
|  | −30° C. |  | 48 | 47 | 48 | 46 |

TABLE 2-continued

| Flame retardancy | 1.2 mm | | V-0 | V-0 | V-0 | V-0 |
|---|---|---|---|---|---|---|
| | 1.5 mm | | V-0 | V-0 | V-0 | V-0 |
| | 1.8 mm | | V-0 | V-0 | V-0 | V-0 |
| Tracking resistance | PTI | V | 250 | 250 | 250 | 250 |
| Amount of generated gas | | | ○ | ○ | ○ | ○ |

The components in use are detailed hereinbelow.
(Component A)
PC-1: polycarbonate resin powder having a viscosity average molecular weight of 19,800 obtained by the following production method.
[Production Method]
2,340 parts of ion exchange water, 947 parts of a 25% sodium hydroxide aqueous solution and 0.7 part of hydrosulfite were fed to a reactor equipped with a thermometer, a stirrer and a reflux condenser, 710 parts of 2,2-bis(4-hydroxyphenyl) propane (may be referred to as "bisphenol A" hereinafter) was dissolved under agitation (bisphenol A solution), 2,299 parts of methylene chloride and 112 parts of a 48.5% sodium hydroxide aqueous solution were added to the resulting solution, and 354 parts of phosgene was blown into the reactor at 15 to 25° C. for about 90 minutes to carry out a phosgene reaction. After the end of the phosgene reaction, 148 parts of a 11% methylene chloride solution of p-tert-butylphenol and 88 parts of a 48.5% sodium hydroxide aqueous solution were added, stirring was suspended, the resulting solution was left to stand for 10 minutes and separated, stirring was resumed to emulsify the solution, and five minutes after that, the obtained emulsion was treated 35 times of pass at a revolution of 1,200 rpm by means of a homomixer (manufactured by PRIMIX Corporation) to obtain highly emulsified dope. This highly emulsified dope was reacted in a polymerization tank (having a stirrer) at a temperature of 35° C. for 3 hours under no agitation to complete polymerization. After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate powder. After dehydration, the powder was dried at 120° C. for 12 hours with a hot air circulation drier to obtain a polycarbonate resin powder.
PC-2: polycarbonate resin powder having a viscosity average molecular weight of 16,500 obtained by the following production method
[Production Method]
This polycarbonate resin powder was obtained in the same manner as PC-1 except that the amount of the 11% methylene chloride solution of p-tert-butylphenol was changed to 193 parts.
PC-3: polycarbonate resin powder having a viscosity average molecular weight of 23,200 obtained by the following production method
[Production Method]
This polycarbonate resin powder was obtained in the same manner as PC-1 except that the amount of the 11% methylene chloride solution of p-tert-butylphenol was changed to 118 parts.
(Component B)
B-1: polycarbonate-polydiorganosiloxane copolymer resin powder having a viscosity average molecular weight of 19,400 obtained by the following production method

[Production Method]
21,591 parts of ion exchange water and 3,674 parts of a 48.5% sodium hydroxide aqueous solution were fed to a reactor equipped with a thermometer, a stirrer and a reflux condenser, 3,880 parts of 2,2-bis(4-hydroxyphenyl)propane (bisphenol A) and 7.6 parts of hydrosulfite were dissolved, 14,565 parts (14 moles based on 1 mole of the dihydroxy compound (I)) of methylene chloride was added, and 1,900 parts of phosgene was blown into the reactor at 22 to 30° C. for about 60 minutes under agitation. Thereafter, 1,131 parts of a 48.5% sodium hydroxide aqueous solution and a solution prepared by dissolving 105 parts of p-tert-butylphenol in 800 parts of methylene chloride were added, and a solution prepared by dissolving 430 parts of a polydiorganosiloxane compound represented by the following formula [8] (average number "p" of repetitions in the formula of about 37) in 1,600 parts of methylene chloride was added under agitation at a rate which ensured that the amount of the dihydroxyaryl-terminated polydiorganosiloxane (II) became 0.0008 mole/min based on 1 mole of the dihydric phenol (I) to be emulsified and violently stirred again. Under agitation, 4.3 parts of triethylamine was added while the temperature of the reaction solution was 26° C., and stirring was continued for 45 minutes at a temperature of 26 to 31° C. to terminate the reaction. After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate-polydiorganosiloxane copolymer resin powder. After dehydration, the powder was dried at 120° C. for 12 hours with a hot air circulation drier to obtain a polycarbonate-polydiorganosiloxane copolymer resin powder. (content of polydiorganosiloxane component of 8.2%, average domain size of polydiorganosiloxane domains of 9 nm, viscosity average molecular weight of 19,400).

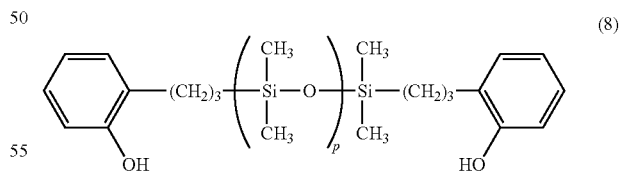

(8)

B-2: polycarbonate-polydiorganosiloxane copolymer resin powder having a viscosity average molecular weight of 15,000 obtained by the following production method
[Production Method]
This polycarbonate-polydiorganosiloxane copolymer resin powder was obtained in the same manner as B-1 except that the amount of p-tert-butylphenol was changed to 132 parts. (content of polydiorganosiloxane component of 8.2%, average size of polydiorganosiloxane domains of 9 nm, viscosity average molecular weight of 15,000)

b-3: polycarbonate-polydiorganosiloxane copolymer resin powder having a viscosity average molecular weight of 20,500 obtained by the following production method
[Production Method]

21,591 parts of ion exchange water and 3,674 parts of a 48.5% sodium hydroxide aqueous solution were fed to a reactor equipped with a thermometer, a stirrer and a reflux condenser, 3,880 parts of 2,2-bis(4-hydroxyphenyl)propane (bisphenol A) and 7.6 parts of hydrosulfite were dissolved, 14,565 parts (10 moles based on 1 mole of the dihydroxy compound (I)) of methylene chloride was added, and 1,900 parts of phosgene was blown into the reactor at 22 to 30° C. for about 60 minutes under agitation. Thereafter, 1,131 parts of a 48.5% sodium hydroxide aqueous solution and a solution prepared by dissolving 105 parts of p-tert-butylphenol in 800 parts of methylene chloride were added, and a solution prepared by dissolving 430 parts of a polydiorganosiloxane compound represented by the above formula [8] (average number of repetitions in the formula of about 37) in 100 parts of methylene chloride was added under agitation at a rate which ensured that the amount of the dihydroxyaryl-terminated polydiorganosiloxane (II) became 0.5 mole/min based on 1 mole of the dihydric phenol (I) to be emulsified and violently stirred again. Under agitation, 4.3 parts of triethylamine was added while the temperature of the reaction solution was 26° C., and stirring was continued for 45 minutes at a temperature of 26 to 31° C. to terminate the reaction. After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate-polydiorganosiloxane copolymer resin powder. After dehydration, the powder was dried at 120° C. for 12 hours with a hot air circulation drier to obtain a polycarbonate-polydiorganosiloxane copolymer resin powder. (content of polydiorganosiloxane component of 8.3%, average size of polydiorganosiloxane domains of 24 nm, viscosity average molecular weight of 20,500).

b-4: polycarbonate-polydiorganosiloxane copolymer resin powder having a viscosity average molecular weight of 20,300 obtained by the following production method
[Production Method]

21,591 parts of ion exchange water and 3,674 parts of a 48.5% sodium hydroxide aqueous solution were fed to a reactor equipped with a thermometer, a stirrer and a reflux condenser, 3,880 parts of 2,2-bis(4-hydroxyphenyl)propane (bisphenol A) and 7.6 parts of hydrosulfite were dissolved, 14,565 parts (10 moles based on 1 mole of the dihydroxy compound (I)) of methylene chloride was added, and 1,900 parts of phosgene was blown into the reactor at 22 to 30° C. for about 60 minutes under agitation. Thereafter, 1,131 parts of a 48.5% sodium hydroxide aqueous solution and a solution prepared by dissolving 105 parts of p-tert-butylphenol in 800 parts of methylene chloride were added, and a solution prepared by dissolving 685 parts of a polydiorganosiloxane compound represented by the above formula [8] (average number of repetitions in the formula of about 37) in 170 parts of methylene chloride was added under agitation at a rate which ensured that the amount of the dihydroxyaryl-terminated polydiorganosiloxane (II) became 0.5 mole/min based on 1 mole of the dihydric phenol (I) to be emulsified and violently stirred again. Under agitation, 4.3 parts of triethylamine was added while the temperature of the reaction solution was 26° C., and stirring was continued for 45 minutes at a temperature of 26 to 31° C. to terminate the reaction. After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate-polydiorganosiloxane copolymer resin powder. After dehydration, the powder was dried at 120° C. for 12 hours with a hot air circulation drier to obtain a polycarbonate-polydiorganosiloxane copolymer resin powder. (content of polydiorganosiloxane component of 12.5%, average size of polydiorganosiloxane domains of 46 nm, viscosity average molecular weight of 20,300).

(Component D)
D-1: potassium salt of perfluorobutanesulfonic acid (MEGAFACE F-114P of DIC Corporation)
D-2: sodium salt of perfluorobutanesulfonic acid (MEGAFACE F-114S of DIC Corporation)
D-3: potassium diphenylsulfonesulfonate (KSS of Arichem Co., Ltd.)

(Component C)
C-1: polyethylene resin having a density of 0.95 g/cm$^3$, an acid value of 1 mg/KOH and a weight average molecular weight of 60,000 (HIZEX (trademark) 2100JP of Mitsui Chemicals, Inc.)
c-2: polypropylene resin having a density of 0.90 g/cm$^3$, an acid value of 1 mg/KOH and a weight average molecular weight of 500,000 (SunAllomer (trademark) PL-400A of SunAllomer Ltd.)

(Component E)
E-1: mixture of a polytetrafluoroethylene particle and a styrene-acrylic copolymer (SN3307 (trade name) of Shine Polymer Technology Co., Ltd.)
E-2: mixture of a branched polytetrafluoroethylene particle and a styrene-acrylic copolymer (SN3300B7 (trade name) of Shine Polymer Technology Co., Ltd.)

(Component F)
F-1: benzotriazole-based ultraviolet absorbent (KEMISORB 79 of Chemipro Kasei Kaisha, Ltd.)
F-2: benzotriazole-based ultraviolet absorbent (Tinuvin 234 of BASF Japan Ltd.)

(Other Components)
a: stearyl 3-(3,5-di-tert-butyl-4-hydroxyphenyl)propionate (Irganox 1076 of BASF Japan Ltd.)
CB: carbon black (RB-961S of ECCA Co., Ltd.)
TiO$_2$: titanium dioxide (White DCF-T-17007 of Resino Color Industry Co., Ltd.)

Effect of the Invention

The resin composition of the present invention has excellent low-temperature impact resistance and flowability high enough to enable thin molding, and a coated molded article thereof has a good appearance and high impact resistance. The resin composition of the present invention has excellent low-temperature impact resistance, tracking resistance and flame retardancy and rarely produces a gas which causes an electric contact fault.

INDUSTRIAL FEASIBILITY

A molded article of the resin composition of the present invention is useful for various applications such as electronic and electric equipment parts (especially mobile infor-

The invention claimed is:

1. A resin composition comprising 100 parts by weight of a resin component comprising a polycarbonate resin (component A) and a polycarbonate-polydiorganosiloxane copolymer resin (component B), 0.5 to 2.5 parts by weight of a polyolefin resin (component C) based on 100 parts by weight of the resin component, wherein the component C is a polyolefin resin having a density of 0.93 to 0.99 g/cm³ and a weight average molecular weight of 3,000 to 1,000,000 g/mol, and 0.01 to 1.0 part by weight of an organic metal salt-based compound (component D) based on 100 parts by weight of the resin component, wherein the component D is at least one organic alkali (earth) metal salt selected from the group consisting of alkali (earth) metal salts of a perfluoroalkylsulfonic acid, alkali (earth) metal salts of an aromatic sulfonic acid and alkali (earth) metal salts of an aromatic imide, and wherein the amount of a cyclic low-molecular weight siloxane measured under heating at 150° C. for 30 minutes by a cryotrapping GC-MS method is not more than 1 μg/mg based on the weight of the resin composition, wherein the cyclic low-molecular weight siloxane is represented by the following formula [9]:

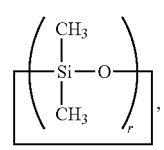

wherein "r" is a natural number of 3 to 6.

2. The resin composition according to claim 1, wherein the component B is a polycarbonate-polydiorganosiloxane copolymer resin comprising a polycarbonate block represented by the following formula [1] and a polydiorganosiloxane block represented by the following formula [3]:

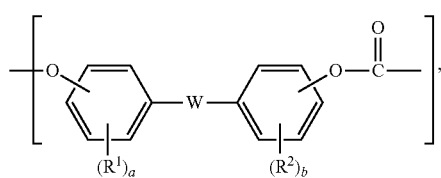

wherein in the formula [1], $R^1$ and $R^2$ are each independently a group selected from the group consisting of a hydrogen atom, a halogen atom, an alkyl group having 1 to 18 carbon atoms, an alkoxy group having 1 to 18 carbon atoms, a cycloalkyl group having 6 to 20 carbon atoms, a cycloalkoxy group having 6 to 20 carbon atoms, an alkenyl group having 2 to 10 carbon atoms, an aryl group having 6 to 14 carbon atoms, an aryloxy group having 6 to 14 carbon atoms, an aralkyl group having 7 to 20 carbon atoms, an aralkyloxy group having 7 to 20 carbon atoms, a nitro group, an aldehyde group, a cyano group and a carboxyl group, when there are a plurality of $R^1$'s and a plurality of $R^2$'s, they may be the same or different, "a" and "b" are each an integer of 1 to 4, and W is a single bond or at least one group selected from the group consisting of groups represented by the following formula [2]:

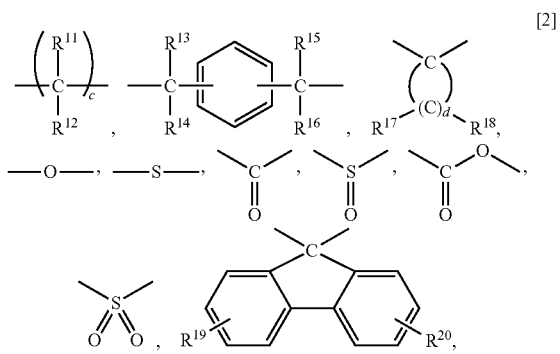

wherein in the formula [2], $R^{11}$, $R^{12}$, $R^{13}$, $R^{14}$, $R^{15}$, $R^{16}$, $R^{17}$ and $R^{18}$ are each independently a group selected from the group consisting of a hydrogen atom, an alkyl group having 1 to 18 carbon atoms, an aryl group having 6 to 14 carbon atoms and an aralkyl group having 7 to 20 carbon atoms, $R^{19}$ and $R^{20}$ are each independently a group selected from the group consisting of a hydrogen atom, a halogen atom, an alkyl group having 1 to 18 carbon atoms, an alkoxy group having 1 to 10 carbon atoms, a cycloalkyl group having 6 to 20 carbon atoms, a cycloalkoxy group having 6 to 20 carbon atoms, an alkenyl group having 2 to 10 carbon atoms, an aryl group having 6 to 14 carbon atoms, an aryloxy group having 6 to 10 carbon atoms, an aralkyl group having 7 to 20 carbon atoms, an aralkyloxy group having 7 to 20 carbon atoms, a nitro group, an aldehyde group, a cyano group and a carboxyl group, when there are a plurality of each of them, they may be the same or different, "c" is an integer of 1 to 10, and "d" is an integer of 4 to 7,

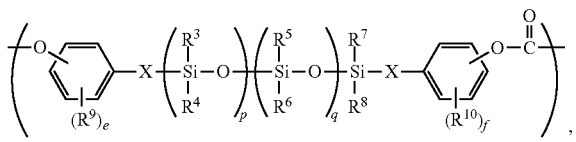

wherein in the formula [3], $R^3$, $R^4$, $R^5$, $R^6$, $R^7$ and $R^8$ are each independently a hydrogen atom, an alkyl group having 1 to 12 carbon atoms, or a substituted or nonsubstituted aryl group having 6 to 12 carbon atoms, $R^9$ and $R^{10}$ are each independently a hydrogen atom, a halogen atom, an alkyl group having 1 to 10 carbon atoms or an alkoxy group having 1 to 10 carbon atoms, "e" and "f" are each an integer of 1 to 4, "p" is a natural number, "q" is 0 or a natural number, p+q is a natural number of 4 to 150, and X is a divalent aliphatic group having 2 to 8 carbon atoms.

3. The resin composition according to claim 2, wherein the content of a polydiorganosiloxane block represented by the following formula [4] contained in the formula [3] is 1.0 to 10.0 wt % based on the total weight of the resin composition:

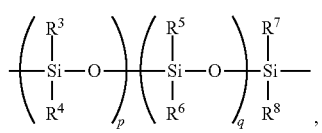

[4]

wherein in the formula [4], $R^3$, $R^4$, $R^5$, $R^6$, $R^7$ and $R^8$ are each independently a hydrogen atom, an alkyl group having 1 to 12 carbon atoms, or a substituted or nonsubstituted aryl group having 6 to 12 carbon atoms, "p" is a natural number, "q" is 0 or natural number, and p+q is a natural number of 4 to 150.

4. The resin composition according to claim 3, wherein p+q in the formula [4] is a natural number of 4 to 120.

5. The resin composition according to claim 1, wherein the component B is a polycarbonate-polydiorganosiloxane copolymer resin in which polydiorganosiloxane domains having an average size of 5 to 18 nm are existent in the matrix of a polycarbonate polymer.

6. The resin composition according to claim 1, further comprising 0.01 to 0.4 part by weight of a polytetrafluoroethylene having fibril forming ability (component E) based on 100 parts by weight of the resin component.

7. The resin composition according to claim 6, wherein the component E is branched polytetrafluoroethylene.

8. The resin composition according to claim 1, further comprising 0.01 to 3 parts by weight of an ultraviolet absorbent (component F) based on 100 parts by weight of the resin component.

9. A molded article comprising the resin composition according to claim 1.

10. The molded article according to claim 9 which is coated.

11. The molded article according to claim 9 which is the exterior member of a mobile information terminal.

12. A resin composition comprising 100 parts by weight of a resin component comprising a polycarbonate resin (component A) and a polycarbonate-polydiorganosiloxane copolymer resin (component B), 0.5 to 2.5 parts by weight of a polyolefin resin (component C) based on 100 parts by weight of the resin component, wherein the component C is a polyolefin resin having a density of 0.93 to 0.99 g/cm$^3$ and a weight average molecular weight of 3,000 to 1,000,000 g/mol, and 0.01 to 1.0 part by weight of an organic metal salt-based compound (component D) based on 100 parts by weight of the resin component, wherein the component D is at least one organic alkali (earth) metal salt selected from the group consisting of alkali (earth) metal salts of a perfluoroalkylsulfonic acid, alkali (earth) metal salts of an aromatic sulfonic acid and alkali (earth) metal salts of an aromatic imide.

* * * * *